United States Patent
Tsai et al.

(10) Patent No.: US 12,108,481 B2
(45) Date of Patent: Oct. 1, 2024

(54) USER EQUIPMENT AND METHOD FOR SMALL DATA TRANSMISSION PROCEDURE

(71) Applicant: FG Innovation Company Limited, Tuen Mun (HK)

(72) Inventors: Hsin-Hsi Tsai, Taipei (TW); Heng-Li Chin, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 380 days.

(21) Appl. No.: 17/696,242

(22) Filed: Mar. 16, 2022

(65) Prior Publication Data

US 2022/0304100 A1    Sep. 22, 2022

Related U.S. Application Data

(60) Provisional application No. 63/162,475, filed on Mar. 17, 2021.

(51) Int. Cl.
*H04W 4/00* (2018.01)
*H04W 76/27* (2018.01)

(52) U.S. Cl.
CPC .................................. *H04W 76/27* (2018.02)

(58) Field of Classification Search
CPC ..... H04W 76/27; H04W 76/19; H04W 76/30; H04W 28/04; H04W 72/04; H04W 72/042; H04W 88/08; H04W 28/08; H04W 28/084; H04W 36/22; H04W 72/12; Y02D 30/70; H04L 5/0048; H04L 5/0007
See application file for complete search history.

(56) References Cited

U.S. PATENT DOCUMENTS 11,582,790 B2 *  2/2023  Tsai ..................... H04W 76/11
2022/0022276 A1 *  1/2022  Shih ....................... H04L 5/001

(Continued)

FOREIGN PATENT DOCUMENTS

CA        3126402 A1 *  2/2020  ............. H04L 5/001
CN    113518453 A  * 10/2021  ............. H04W 72/21

OTHER PUBLICATIONS

3GPP TS 38.331, "3rd Generation Partnership Project; Technical Specification Group Radio Access Network; NR; Radio Resource Control (RRC) protocol specification (Release 16)", V16.3.1 (Jan. 2021).

(Continued)

*Primary Examiner* — Phuongchau Ba Nguyen
(74) *Attorney, Agent, or Firm* — ScienBiziP, P.C.

(57) ABSTRACT

A method performed by a UE for a Small Data Transmission (SDT) procedure is provided. The method comprises receiving, from a Base Station (BS), a Radio Resource Control (RRC) release message including an SDT configuration while the UE is in an RRC_CONNECTED state; transitioning to an RRC_INACTIVE state from the RRC_CONNECTED state in response to receiving the RRC release message; and determining, by an RRC layer of the UE, whether to initiate the SDT procedure based on the SDT configuration when the RRC layer receives a first indication from a Medium Access Control (MAC) layer of the UE, wherein the first indication indicates whether at least one condition for initiating the SDT procedure is fulfilled or not.

16 Claims, 9 Drawing Sheets

(56) References Cited

U.S. PATENT DOCUMENTS

| | | | | |
|---|---|---|---|---|
| 2022/0086946 | A1* | 3/2022 | Huang | H04W 72/23 |
| 2022/0210798 | A1* | 6/2022 | Tsai | H04L 5/0094 |
| 2022/0210860 | A1* | 6/2022 | Chin | H04W 72/23 |
| 2022/0346135 | A1* | 10/2022 | Chen | H04W 74/0833 |
| 2023/0030443 | A1* | 2/2023 | Chen | H04W 56/0045 |
| 2023/0102937 | A1* | 3/2023 | Kim | H04W 76/27 370/329 |
| 2023/0141487 | A1* | 5/2023 | Chin | H04W 52/0235 370/328 |
| 2023/0180223 | A1* | 6/2023 | Tseng | H04W 76/27 370/329 |
| 2024/0057173 | A1* | 2/2024 | Liu | H04W 24/04 |

OTHER PUBLICATIONS

3GPP TS 38.323, "3rd Generation Partnership Project; Technical Specification Group Radio Access Network; NR; Packet Data Convergence Protocol (PDCP) specification (Release 16)", V16.2.0 (Sep. 2020).
3GPP TS 38.322, "3rd Generation Partnership Project; Technical Specification Group Radio Access Network; NR; Radio Link Control (RLC) protocol specification (Release 16)", V16.2.0 (Dec. 2020).
3GPP TS 38.321, "3rd Generation Partnership Project; Technical Specification Group Radio Access Network; NR; Medium Access Control (MAC) protocol specification (Release 16)", V16.3.0 (Dec. 2020).
3GPP TS 38.304, "3rd Generation Partnership Project; Technical Specification Group Radio Access Network; NR; User Equipment (UE) procedures in Idle mode and RRC Inactive state (Release 16)", V16.3.0 (Dec. 2020).
3GPP TS 38.300, 3rd Generation Partnership Project; Technical Specification Group Radio Access Network; NR; NR and NG-RAN Overall Description; Stage 2 (Release 16), V16.4.0 (Dec. 2020).
3GPP TS 38.214, "3rd Generation Partnership Project; Technical Specification Group Radio Access Network; NR; Physical layer procedures for data (Release 16)", V16.4.0 (Dec. 2020).
3GPP TS 38.213, "3rd Generation Partnership Project; Technical Specification Group Radio Access Network; NR; Physical layer procedures for control (Release 16)", V16.4.0 (Dec. 2020).
3GPP TS 38.212, "3rd Generation Partnership Project; Technical Specification Group Radio Access Network; NR; Multiplexing and channel coding (Release 16)", V16.3.0 (Sep. 2020).

* cited by examiner

USER EQUIPMENT AND METHOD FOR SMALL DATA TRANSMISSION PROCEDURE

CROSS-REFERENCE TO RELATED APPLICATION(S)

The present disclosure claims the benefit of and priority to U.S. Provisional Patent Application Ser. No. 63/162,475, filed on Mar. 17, 2021, entitled "SMALL DATA TRANSMISSION FAILURE," the content of which is hereby incorporated fully by reference herein into the present disclosure for all purposes.

FIELD

The present disclosure is related to wireless communication, and more specifically, to a small data transmission procedure in wireless communication system.

BACKGROUND

Abbreviations used in this disclosure include:

| Abbreviation | Full name |
| --- | --- |
| 3GPP | 3rd Generation Partnership Project |
| 5GC | 5G Core |
| ACK | Positive Acknowledgement |
| AM | Acknowledged Mode |
| AS | Access Stratum |
| BFI | Beam Failure Indication/Beam Failure Instance |
| BFR | Beam Failure Recovery |
| BS | Base Station |
| BSR | Buffer Status Report |
| BWP | Bandwidth Part |
| CBRA | Contention Based Random Access |
| CCCH | Common Control Channel |
| CE | Control Element |
| CFRA | Contention Free Random Access |
| CG | Configured Grant |
| CN | Core Network |
| CORESET | Control Resource Set |
| C-RNTI | Cell-Radio Network Temporary Identifier |
| CS-RNTI | Configured Scheduling-Radio Network Temporary Identifier |
| CSI | Channel State Information |
| CSI-RS | Configured Scheduling-Reference Signal |
| CSS | Common Search Space |
| DCI | Downlink Control Information |
| DL | Downlink |
| DMRS | DeModulation Reference Signal |
| DRX | Discontinuous Reception |
| EPS | Evolved Packet System |
| FR | Frequency Range |
| gNB | Next Generation Node B |
| HARQ | Hybrid Automatic Repeat Request |
| ID | Identifier/Identity |
| IE | Information Element |
| IMS | IP Multimedia Subsystem |
| L1 | Layer 1 |
| LCH | Logical Channel |
| LCP | Logical Channel Prioritization |
| MAC | Medium Access Control |
| MCG | Master Cell Group |
| Msg | Message |
| NAS | Non-Access Stratum |
| NG-RAN | Next Generation-Radio Access Network |
| NR | New Radio |
| NW | Network |
| NUL | Normal Uplink |
| OFDM | Orthogonal Frequency Division Multiplexing |
| PCell | Primary Cell |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical Layer |
| PHR | Power Headroom Report |
| PRACH | Physical Random Access Channel |
| PSCell | Primary Secondary Cell |
| PUCCH | Physical Uplink Control Channel |
| PUSCH | Physical Uplink Shared Channel |
| QCL | Quasi Co Location |
| QoS | Quality of Service |
| RA | Random Access |
| RACH | Random Access Channel |
| RAR | Random Access Response |
| RAN | Radio Access Network |
| Rel | Release |
| RLC | Radio Link Control |
| RLF | Radio Link Failure |
| RNA | RAN Notification Area |
| RNTI | Radio Network Temporary Identifier |
| RO | RACH Occasion |
| RRC | Radio Resource Control |
| RS | Reference Signal |
| RSRP | Reference Signal Received Power |
| RX | Reception |
| SCell | Secondary Cell |
| SCO | Secondary Cell Group |
| SCS | Sub Carrier Spacing |
| SDAP | Service Data Adaptation Protocol |
| SDT | Small Data Transmission |
| SDU | Service Data Unit |
| SFN | System Frame Number |
| SI | System Information |
| SN | Sequence Number |
| SIB | System Information Block |
| SPS | Semi-Persistent Scheduling |
| SRB | Signaling Radio Bearer |
| SpCell | Special Cell |
| SS | Search Space |
| SSB | Synchronization Singla Block |
| SS-RSRP | Synchronization Signal-Reference Signal Received Power |
| SUL | Supplementary Uplink |
| TA | Timing Alignment/Timing Advance |
| TAT | Timing Alignment Timer |
| TBS | Transport Block Size |
| TCI | Transmission Configuration Indicator |
| TRS | Tracking Reference Signal |
| TRP | Transmission and Reception Point |
| TS | Technical Specification |
| Tx | Transmission |
| UCI | Uplink Control Information |
| UE | User Equipment |
| UL | Uplink |
| UM | Unacknowledged Mode |
| USS | UE-Specific Search Space |

Various efforts have been made to improve different aspects of wireless communication for cellular wireless communication systems, such as fifth generation (5G) new radio (NR), by improving data rate, latency, reliability, and mobility in these systems. The 5G NR system is designed to provide flexibility and configurability to optimize network services and types, accommodating various use cases, such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art, such as improvements in a small data transmission (SDT) procedure for wireless communication.

SUMMARY

The present disclosure is related to an SDT procedure in a wireless communication system.

In a first aspect of the present disclosure, a method performed by a UE for a Small Data Transmission (SDT) procedure is provided. The method comprises receiving, from a Base Station (BS), a Radio Resource Control (RRC) release message including an SDT configuration while the UE is in an RRC_CONNECTED state; transitioning to an RRC_INACTIVE state from the RRC_CONNECTED state in response to receiving the RRC release message; and determining, by an RRC layer of the UE, whether to initiate the SDT procedure based on the SDT configuration when the RRC layer receives a first indication from a Medium Access Control (MAC) layer of the UE, wherein the first indication indicates whether at least one condition for initiating the SDT procedure is fulfilled or not.

In an implementation of the first aspect, the at least one condition comprises a Reference Symbol Received Power (RSRP) of at least a Synchronization Signal Block (SSB) being above a threshold.

In another implementation of the first aspect, the threshold is a RSRP threshold configured for SSB selection for a Configured Grant (CG)-based SDT.

In an implementation of the first aspect, the at least one condition comprises a Configured Grant (CG) resource being valid.

In an implementation of the first aspect, the method further comprises transitioning, by the RRC layer, to an RRC_IDLE state when a timer expires.

In another implementation of the first aspect, the method further comprises initiating, by the RRC layer, the timer when the SDT procedure is initiated.

In another implementation of the first aspect, the method further comprises initiating, by the RRC layer, the timer upon transmission of an RRC resume request message to the BS.

In another implementation of the first aspect, the method further comprises stopping, by the RRC layer, the timer upon reception of an RRC message from the BS, wherein the RRC message is at least one of an RRC reject message, an RRC release message, an RRC setup message, and an RRC resume message In another implementation of the first aspect, the method further comprises stopping, by the RRC layer, the timer upon performing a cell selection procedure or a cell reselection procedure.

In another implementation of the first aspect, the method further comprises transitioning, by the RRC layer, to an RRC_IDLE state, when the RRC layer receives a second indication from a Radio Link Control (RLC) layer of the UE, wherein the second indication indicates that a maximum number of retransmissions has been reached.

In a second aspect of the present disclosure, a UE in a wireless communication system for a Small Data Transmission (SDT) procedure is provided. The UE comprises at least one processor; and at least one memory coupled to the at least one processor, wherein the at least one memory stores a computer-executable program that, when executed by the at least one processor, causes the UE to receive, from a Base Station (BS), a Radio Resource Control (RRC) release message including an SDT configuration while the UE is in an RRC_CONNECTED state; transition to an RRC_INACTIVE state from the RRC_CONNECTED state in response to receiving the RRC release message; and determine, by an RRC layer of the UE, whether to initiate the SDT procedure based on the SDT configuration when the RRC layer receives a first indication from a Medium Access Control (MAC) layer of the UE, wherein the first indication indicates whether at least one condition for initiating the SDT procedure is fulfilled or not.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
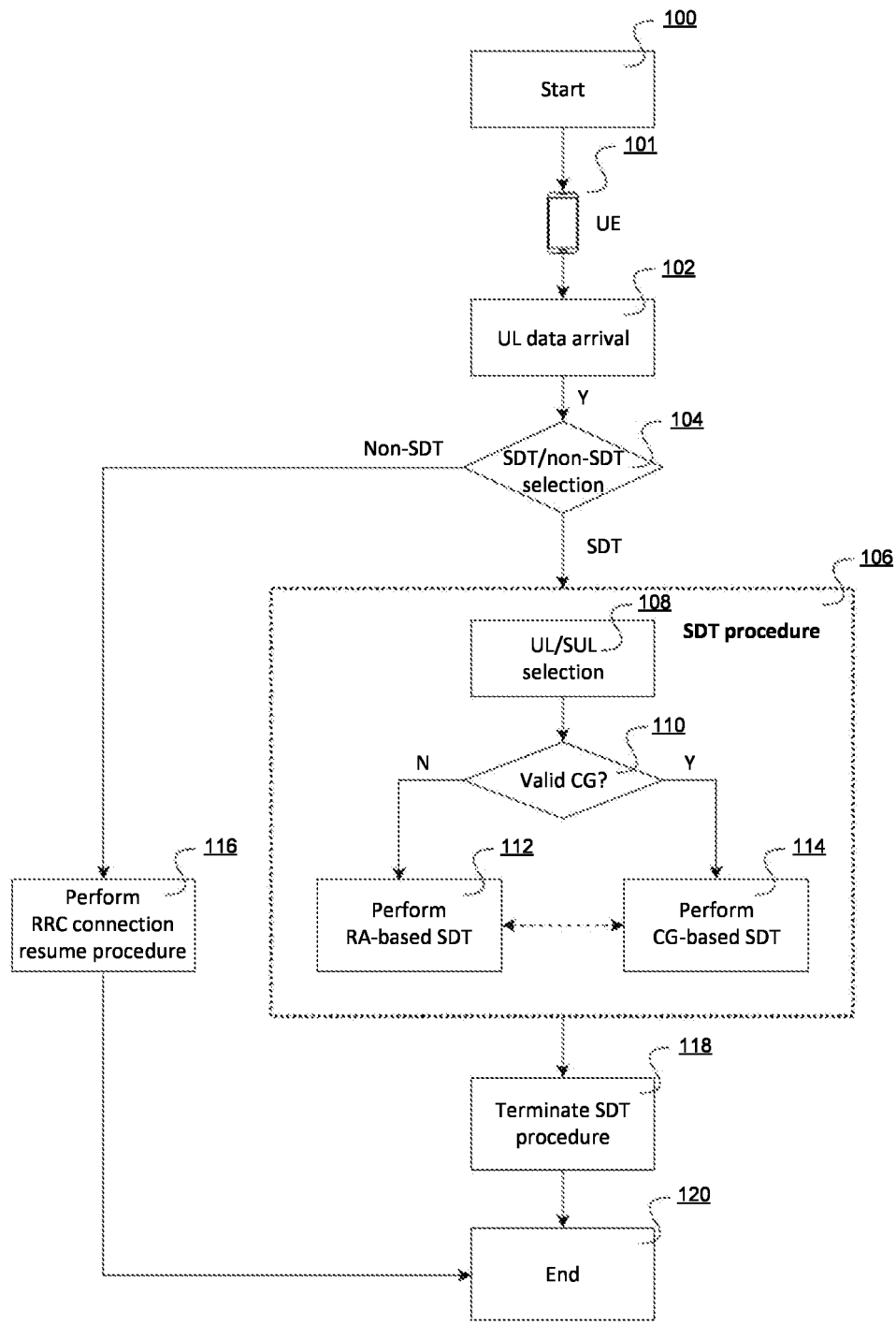
FIG. 1 illustrates a flowchart of an SDT procedure, according to an example implementation of the present disclosure.

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

Additionally, for the purpose of non-limiting explanation, specific details, such as functional entities, techniques, protocols, standards, and the like, are set forth for providing an understanding of the disclosed technology. In other examples, a detailed disclosure of well-known methods, technologies, systems, architectures, and the like are omitted in order not to obscure the present disclosure with unnecessary details.

Persons skilled in the art will immediately recognize that any NW function(s) or algorithm(s) in the present disclosure may be implemented by hardware, software, or a combination of software and hardware. Disclosed functions may correspond to modules that may be software, hardware, firmware, or any combination thereof. The software implementation may comprise computer-executable instructions stored on computer-readable media such as memory or other types of storage devices.

For example, one or more microprocessors or general-purpose computers with communication processing capability may be programmed with corresponding executable instructions and carry out the disclosed NW function(s) or algorithm(s). The microprocessors or general-purpose computers may be formed of Application-Specific Integrated Circuitry (ASIC), programmable logic arrays, and/or using one or more Digital Signal Processor (DSPs). Although some of the example implementations in the present disclosure are directed to software installed and executing on computer hardware, alternative example implementations implemented as firmware or as hardware or combination of hardware and software are well within the scope of the present disclosure.

The computer-readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication NW architecture (e.g., a LTE system, an LTE-Advanced (LTE-A) system, or an LTE-Advanced Pro system) typically includes at least one BS, at least one UE, and one or more optional NW elements that provide connection towards an NW. The UE communicates with the NW (e.g., a CN, an Evolved Packet Core (EPC) NW, an Evolved Universal Terrestrial Radio Access NW (E-UTRAN), a Next-Generation Core (NGC), a 5G Core (5GC) Network or an Internet), through a RAN established by the BS/Cell.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but not limited to, a Node B (NB) as in the Universal Mobile Telecommunication System (UMTS), an evolved Node B (eNB) as in the LTE-A, a Radio NW Controller (RNC) as in the UMTS, a Base Station Controller (BSC) as in the Global System for Mobile communications (GSM)/GSM EDGE (Enhanced Data rates for GSM Evolution) Radio Access NW (GERAN), a Next Generation eNB (ng-eNB) as in an E-UTRA BS in connection with the 5GC, a gNB as in the 5G Access NW (5G-AN), and any other apparatus capable of controlling radio communication and managing radio resources within a cell. The BS may connect to serve the one or more UEs through a radio interface to the NW.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), LTE-A Pro, and a next generation RAT. However, the scope of the present disclosure should not be limited to the protocols previously disclosed.

The BS may be operable to provide radio coverage to a specific geographical area using a plurality of cells included in the RAN. The BS may support the operations of the cells. Each cell is operable to provide services to at least one UE within its radio coverage. More specifically, each cell (often referred to as a serving cell) may provide services to serve one or more UEs within its radio coverage (e.g., each cell schedules the DL and optionally UL resources to at least one UE within its radio coverage for DL and optionally UL packet transmissions). The BS may communicate with one or more UEs in the radio communication system through the plurality of cells. A cell may allocate sidelink (SL) resources for supporting proximity service (ProSe). Each cell may have overlapped coverage areas with other cells.

In Multi-RAT Dual Connectivity (MR-DC) cases, the primary cell of an MCG or a SCG may be called as a SpCell. A PCell may refer to the SpCell of an MCG. A PSCell may refer to the SpCell of an SCG. MCG refers to a group of serving cells associated with the Master Node (MN), comprising the SpCell and optionally one or more SCells. SCG refers to a group of serving cells associated with the Secondary Node (SN), comprising of the SpCell and optionally one or more SCells.

In some implementations, the UE may not have (LTE/NR) RRC connections with the concerned serving cells of the associated services. In other words, the UE may not have UE-specific RRC signalings exchange with the serving cell. Instead, the UE may only monitor the DL synchronization signals (e.g., DL synchronization burst sets) and/or broadcast SI related to the concerned services from such serving cells. In addition, the UE may have at least one serving cell on one or more target SL frequency carriers for the associated services. In some other implementations, the UE may consider the RAN which configures one or more of the serving cells as a serving RAN.

As previously disclosed, the frame structure for NR supports flexible configurations for accommodating various next generation (e.g., 5G) communication requirements, such as eMBB, mMTC, and URLLC, while fulfilling high reliability, high data rate, and low latency requirements. The OFDM technology, as disclosed in 3GPP, may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or service applications.

It is also considered that in a transmission time interval of a single NR frame, at least DL transmission data, a guard period, and UL transmission data should be included. The respective portions of the DL transmission data, the guard period, the UL transmission data should also be configurable, for example, based on the NW dynamics of NR. In addition, SL resources may also be provided in an NR frame to support ProSe services.

Any two or more than two of the following sentences, paragraphs, (sub)-bullets, points, actions, behaviors, terms, alternatives, aspects, examples, or claims described in the following invention(s) may be combined logically, reasonably, and properly to form a specific method.

Any sentence, paragraph, (sub)-bullet, point, action, behaviors, terms, alternatives, aspects, examples, or claims described in the following invention(s) may be implemented independently and separately to form a specific method.

Dependency, such as "based on", "more specifically", "preferably", "in one embodiment", "in one alternative", "in one example", "in one aspect", "in one implementation", etc., in the present disclosure is just one possible example which would not restrict the specific method.

Examples of some selected terms are provided as follows.

SDT: The SDT may be a UL data transmission in an RRC_INACTIVE state. The packet size (or data volume) of the UL data may be lower than a threshold. The UL data of SDT may be transmitted during an SDT procedure. The UL data of the SDT may be transmitted via Msg 3 (e.g., based on a 4-step RA), via MsgA (e.g., based on a 2-step RA), and/or via a CG resource (e.g., a CG Type 1). The UL data of the SDT may be transmitted based on a dynamic scheduling and/or a semi-persistent scheduling when the UE is in the RRC_INACTIVE state.

User Equipment (UE): The UE may be referred to as a PHY/MAC/RLC/PDCP/SDAP/RRC entity/layer. Similarly, the PHY/MAC/RLC/PDCP/SDAP/RRC entity/layer may also be referred to as the UE.

Network (NW): The NW may be a NW node, a TRP, a cell (e.g., SpCell, PCell, PSCell, and/or SCell), a eNB, a gNB, and/or a BS.

Serving Cell: The serving cell may be a PCell, a PSCell, or an SCell. The serving cell may be an activated or a deactivated serving cell.

Special Cell (SpCell): For Dual Connectivity operation, the SpCell refers to the PCell of the MCG or the PSCell of the SCG depending on if the MAC entity is associated to the MCG or the SCG, respectively. Alternatively, the SpCell refers to the PCell.

The terms "initiate", "trigger", and "start", may be interchangeably used in some implementations of the present disclosure.

The terms "terminate", "stop", "release", "suspend", "discard", "end", "complete", "abort", and "cancel", may be interchangeably used in some implementations of the present disclosure.

The terms "period", "process", and "duration" may be interchangeably used in some implementations of the present disclosure.

The terms "resource" and "occasion" may be interchangeably used in some implementations of the present disclosure.

The terms "layer", "sublayer", and "entity" may be interchangeably used in some implementations of the present disclosure.

The terms "ongoing", "running", and "pending" may be interchangeably used in some implementations of the present disclosure.

The terms "SDT failure" and "SDT problem" may be interchangeably used in some implementations of the present disclosure.

The terms "upper" and "higher" may be interchangeably used in some implementations of the present disclosure.

The terms "detect", "determine", and "consider" may be interchangeably used in some implementations of the present disclosure.

The terms "send", "transmit", and the "indicate" may be interchangeably used in some implementations of the present disclosure.

The terms "beam", "SSB", "TRS", "CSI-RS", "assistance RS", and "TCI-state" may be interchangeably used in some implementations of the present disclosure.

Small Data Transmission (SDT)

In some implementations, the NR supports an RRC_INACTIVE state and UEs with infrequent (periodic and/or non-periodic) data transmission are generally maintained by the NW in the RRC_INACTIVE state. The UE in the RRC_INACTIVE state did not support data transmission until Rel-16. As a result, prior to support for Rel-16, the UE had to resume the connection (e.g., transitioning to an RRC_CONNECTED state) for any DL RX and/or UL data transmission, and accordingly, connection setup and subsequently release to the RRC_INACTIVE state may be necessary for each data transmission regardless of how small and infrequent the data packets are, which causes unnecessary power consumption and signaling overhead.

Signaling overhead in the RRC_INACTIVE state for the UEs performing the transmission of small data packets may be a significant problem and may be worse when the number of UEs increases in the NR, which affects not only the performance and/or efficiency of the NW but also the capacity of the UE. As such, any device that has intermittent small data packets in the RRC_INACTIVE state may benefit while enabling the SDT in the RRC_INACTIVE state.

Thus, it is important to enable/improve the SDT in NR, e.g., 2-step/4-step RACH and/or CG Type 1, with permission of transmission in the RRC_INACTIVE state.

In some implementations, the (RA-based and/or CG-based) SDT may be assumed with at least one following conditions/situations/scenarios.

Being supported as the baseline for RA-based SDT and CG-based SDT schemes.

Stored "configuration" in the UE Context being used for the RLC bearer configuration.

The 2-step RACH or the 4-step RACH being applied to RA-based SDT in RRC_INACTIVE.

The UL small data being sent in MsgA of the 2-step RACH and/or Msg3 of the 4-step RACH.

SDT being configured by the NW on a per DRB basis.

Data volume threshold being used for the UE to decide whether to do/select SDT or non-SDT.

UL/DL transmission following UL SDT without transitioning to the RRC_CONNECTED state (e.g., from the RRC_INACTIVE state) being supported.

When the UE is in the RRC_INACTIVE state, it may be possible to send multiple UL and DL packets as part of the same SDT procedure and without transitioning to the RRC_CONNECTED state (e.g., being kept in the RRC_INACTIVE state) on dedicated grant.

When the UE receives an RRC release with a Suspend configuration, the UE may perform at least one of the following actions:
  MAC entity being reset, and default MAC cell group configuration being released;
  RLC entities for SRB1 being re-established; and
  SRBs and DRBs being suspended except for SRB0.

Upon initiating an SDT procedure (e.g., for a first transmission of small data), the UE may re-establish at least PDCP entities (for the SDT) and resume the DRBs (for the SDT) (e.g., along with the SRB1).

The first UL message (e.g., Msg3 for the 4-step RACH, MsgA payload for the 2-step RACH and the CG transmission for CG) may contain at least one of the following contents (which may be dependent on the size of the message):
  CCCH message;
  DRB data from one or more DRBs which are configured by the NW for the SDT;
  MAC CEs (e.g., the BSR); and
  Padding bits.

The CCCH message may contain a parameter Resume-MAC-I generated using one stored security key for RRC integrity protection.

New keys may be generated using the stored security context and the Next hop Chaining Counter (NCC) value received in the previous RRCRelease message, and these new keys may be used for generating the data of DRBs that are configured for the SDT.

For CG-based SDT, the configuration of CG resource for the SDT may be contained in the RRCRelease message.

For CG-based SDT, a new TA timer for TA maintenance specified for CG-based SDT in the RRC_INACTIVE may be introduced. The TA timer may be configured with the CG configuration in the RRCRelease message.

For CG-based SDT, the configuration of CG resource for SDT of the UE may be valid while being in the same serving cell.

For CG-based SDT, the UE may use the CG-based SDT if at least one or more or all of the following criteria is fulfilled. (1) user data being smaller than the data volume threshold; (2) the CG resource being configured and valid; and (3) UE having the valid TA.

For CG-based SDT, an association between CG resources and SSBs may be required for the CG-based SDT.

For CG-based SDT, an SS-RSRP threshold may be configured for SSB selection. The UE selects one of the SSB with one SS-RSRP above the threshold and selects the associated CG resource for UL data transmission.

For CG-based SDT, CG-SDT resource configuration may be provided to UEs being in the RRC_CONNCECTD state by the RRCRelease message.

For CG-based SDT, CG-PUSCH resources may be separately configured for NUL and SUL.

For CG-based SDT, RRCRelease message may be used to reconfigure or release the CG-SDT resources while UE is in the RRC_INACTIVE state.

For CG-based SDT, the subsequent data transmission may use the CG resource or DG (e.g., dynamic grant addressed to UE's C-RNTI). The C-RNTI may be the same as the previous C-RNTI or may be configured explicitly by the NW.

For CG-based SDT, one TAT may be started upon receiving the TAT configuration from the gNB, e.g., a RRCRelease message, and may be (re)started upon reception of one TA command.

For CG-based SDT, the UE may release CG resources when the TAT expires in the RRC_INACTIVE state.

For RA-based SDT, up to two preamble groups (corresponding to two different payload sizes for MsgA/Msg3) may be configured by the NW.

If one RACH procedure is initiated for the SDT (e.g., the RA-based SDT being initiated), the UE first performs a RACH type selection as specified in MAC.

For RA-based SDT, the UE may monitor the C-RNTI upon successfully finishing contention resolution.

For RA-based SDT, RACH resources (e.g., a combination of RO with preamble) may be different between the SDT and non-SDT (e.g., RRC connection resume). If ROs for the SDT and non-SDT are different, preamble partitioning between the SDT and non-SDT may not be needed. If ROs for the SDT and non-SDT are the same, preamble partitioning may be needed.

For RA-based SDT, up to two preamble groups (corresponding to two different payload sizes for MsgA/Msg3) may be configured by the NW.

For RA-based SDT, RRCRelease message may be sent at the end to terminate the SDT procedure (e.g., from RRC's view). The RRCRelease message sent at the end of the SDT may contain the CG resource.

RSRP threshold may be used to select between the SDT and non-SDT procedure (e.g., RRC connection resume procedure).

For the SDT, the UE may perform UL carrier selection (e.g., UL and SUL selection).

If CG-SDT resources are configured on the selected UL carrier and are valid, then CG-based SDT is selected to perform. Otherwise, it may introduce the following actions/operations/conditions.
  If the 2-step RA resources (for the SDT) are configured on the UL carrier and criteria to select the 2-step RA (for SDT) is met, then the 2-step RA (for SDT) is chosen;
  else if the 4-step RA resources (for the SDT) are configured on the UL carrier and criteria to select the 4-step RA (for the SDT) is met, then the 4-step is chosen;
  else the UE does not perform the SDT procedure (e.g., the UE may perform the RRC connection resume procedure);
  If both the 2-step RA (for the SDT) and the 4-step RA resources (for the SDT) are configured on the UL carrier, an RA type selection (e.g., the 2-step and 4-step RA type selection) is performed based on the RSRP threshold.

RRC Connection Resume Procedure

The purpose of the RRC connection resume procedure is to resume a suspended RRC connection, including resuming SRB(s) and DRB(s) or perform an RNA update.

In some implementations, the UE may initiate the RRC connection resume procedure when upper layers or AS (when responding to RAN paging, upon triggering RNA updates while the UE is in an RRC_INACTIVE state) requests the resume of a suspended RRC connection.

The suspension of the RRC connection may be initiated by the NW. When the RRC connection is suspended, the UE may store a UE Inactive AS context and any configuration received from the NW and may transit to the RRC_INACTIVE state. The RRC message to suspend the RRC connection may be integrity protected and ciphered.

The resumption of a suspended RRC connection may be initiated by the upper layers when the UE needs to transit from the RRC_INACTIVE state to the RRC_CONNECTED state or by the RRC layer to perform an RNA update or by RAN paging from NG-RAN. When the RRC connection is resumed, the NW may configure the UE according to the RRC connection resume procedure based on the stored UE Inactive AS context and any RRC configuration received from the NW. The RRC connection resume procedure may re-activate the AS security and re-establish the SRB(s) and the DRB(s).

In response to a request to resume the RRC connection, the NW may resume the suspended RRC connection and transition the UE to the RRC_CONNECTED state or reject the request to resume and transition the UE to the RRC_INACTIVE state (with a wait timer), or directly re-suspend the RRC connection and transition the UE to the RRC_INACTIVE state, or directly release the RRC connection and transition the UE to the RRC_IDLE state, or instruct the UE to initiate a NAS level recovery (in this case the NW may transmit an RRC setup message).

Random Access (RA) Procedure

In some implementations, two types of RA procedure may be supported, e.g., a 4-step RA type with a Msg1 and a 2-step RA type with a MsgA. Both types of RA procedure support CBRA and CFRA.

In some implementations, the UE may select the type of RA at initiation of the RA procedure (and/or the SDT procedure) based on following NW configuration:
  when CFRA resources are not configured, an RSRP threshold may be used by the UE to select between the 2-step RA type and the 4-step RA type;
  when CFRA resources for the 4-step RA type are configured, the UE may perform RA with the 4-step RA type; and
  when CFRA resources for the 2-step RA type are configured, the UE may perform RA with the 2-step RA type.

In some implementations, the NW may not configure CFRA resources for the 4-step RA type and the 2-step RA type at the same time for a BWP. The CFRA with the 2-step RA type may be only supported for handover.

In some implementations, the Msg1 of the 4-step RA type may consist of a preamble on PRACH. After the Msg1 transmission, the UE may monitor for a response from the NW within a configured window. For the CFRA, a dedicated preamble for the Msg1 transmission is assigned by the NW and upon receiving an RA response from the NW, the UE may end the RA procedure. For the CBRA, upon reception of the RA response, the UE may send Msg3 using one UL grant scheduled in the response and may monitor contention resolution. If the contention resolution is not successful after Msg3 (re)transmission(s), the UE may go back to Msg1 transmission.

In some implementations, the MsgA of the 2-step RA type may include a preamble on PRACH and a payload on PUSCH. After the MsgA transmission, the UE may monitor for a response from the NW within a configured window. For the CFRA, a dedicated preamble and a PUSCH resource are configured for MsgA transmission, and upon receiving the NW response, the UE may end the RA procedure. For the CBRA, if contention resolution is successful upon receiving the NW response, the UE may end the RA procedure; while if a fallback indication is received in MsgB, the UE may perform Msg3 transmission using the UL grant scheduled in the fallback indication and may monitor contention resolution. If the contention resolution is not successful after the Msg3 (re)transmission(s), the UE may go back to MsgA transmission.

In some implementations, if the RA procedure with the 2-step RA type is not completed after a number of MsgA transmissions, the UE may be configured to switch to the CBRA with the 4-step RA type.

Configured Grant (CG)

In some implementations, with configured grants, the gNB may allocate UL resources for the initial HARQ transmissions to UEs. Two types of configured UL grants may be defined in the following:
  With Type 1 (e.g., CG Type 1), RRC may directly provide the configured UL grant (including the periodicity).
  With Type 2 (e.g., CG type 2), RRC may define the periodicity of the configured UL grant while a PDCCH addressed to CS-RNTI may either signal and activate the configured UL grant, or deactivate it, e.g., a PDCCH addressed to CS-RNTI may indicate that the UL grant can be implicitly reused according to the periodicity defined by RRC until the UL grant is deactivated.

The NW and/or RRC may configure the following parameters when the CG Type 1 is configured:
  cs-RNTI: CS-RNTI for retransmission;
  periodicity: periodicity of the configured grant Type 1;
  timeDomainOffset: Offset of a resource with respect to SFN being equal to 0 in time domain;
  timeDomainAllocation: Allocation of configured UL grant in time domain which contains startSymbolAndLength (e.g., SLIV as specified in TS 38.214); and
  nrofHARQ-Processes: the number of HARQ processes for configured grant.

Upon configuration of a CG Type 1 for a Serving Cell by upper layers, the UE (or MAC entity) may perform the following:
  Storing the UL grant provided by upper layers as a configured UL grant (for the indicated Serving Cell); and
  Initializing or re-initializing the configured UL grant to start in the symbol according to timeDomainOffset and S (derived from SLIV as specified in TS 38.214), and to reoccur with periodicity.

SDT Procedure

FIG. 1 illustrates a flowchart of an SDT procedure 10, according to an example implementation of the present disclosure. In some implementations, actions of the SDT procedure 10 are illustrated as separate actions represented as independent blocks. In some other implementations, these separate actions may not be construed as necessarily order dependent, where any two or more actions may also be performed and/or combined with each other or be integrated with other alternate methods, which is not limiting the scope of the implementation. Moreover, in some other implementations, one or more of the actions may be adaptively omitted.

As shown in FIG. 1, in action 101, the UE may be in an RRC_INACTIVE state after initiation/start (as action 100). The UE may be configured with configurations for the SDT (e.g., an SDT configuration). The configurations for the SDT may be configured via an RRC release message (with suspend configuration). The configuration(s) for the SDT may include at least one of RACH configuration(s), CG configuration(s) and configuration(s) for SRB/DRB used for the SDT.

In action 102, UL data may arrive for transmission. The UL data may be associated with a specific DRB/SRB/LCH.

In action 104, when there is UL data arrival, the UE may determine whether to initiate an SDT procedure shown in action 106 or initiate a RRC connection resume procedure shown in action 116 (e.g., initiating transmission of RRCResumeRequest). The UE may determine whether to initiate/trigger an SDT procedure shown in action 106 or initiate a RRC connection resume procedure shown in action 116 based on one or more criteria, e.g., DRB/SRB, data volume, and/or RSRP, etc. In one implementation, the UE may initiate the SDT procedure when/after at least one LCH/DRB/SRB is configured for the SDT and has pending data. For example, data is available for transmission for only those LCHs/DRBs/SRBs for which SDT is enabled. The LCH/DRB/SRB configured for the SDT may be resumed/re-established when the UE initiates the SDT procedure. In one implementation, the UE may initiate the SDT procedure if data volume for transmission (e.g., for the SDT) is lower than a configured threshold for the SDT. The data volume may only count the volume of the LCH/DRB/SRB configured for the SDT. In one implementation, the UE may initiate the SDT procedure if an RSRP is larger than a configured RSRP threshold for the SDT.

In action 106, there may be two types of the SDT procedure. One is based on an RA procedure (e.g., the 2-step RA or the 4-step RA), e.g., an RA-based SDT shown in action 112. The other is based on a CG (e.g., a CG Type 1), e.g., CG-based SDT shown in action 114. The UE may transmit the small data via a Msg3, a MsgA, a CG resource, and/or a PUSCH resource during the SDT procedure.

In action 108, the UE may perform UL carrier selection (e.g., if one SUL is configured in the cell, a UL carrier may be selected based on the RSRP threshold). After the UL carrier selection, the UE may perform the SDT procedure on the selected UL carrier (e.g., either a UL or a SUL).

In action 110, the UE may determine whether the CG is valid (during the SDT procedure) based on one or more of the following criteria.

The UE may determine whether the CG is valid based on whether the associated beam is valid. Whether the associated beam is valid may be based on an RSRP threshold. The RSRP threshold may be configured in the RRC release message and/or the CG configuration. In one example, if there is at least one beam with one RSRP above the RSRP threshold, the UE may consider the CG resource/configuration valid. If there is no beam with one RSRP above the RSRP threshold, the UE may consider the CG resource/configuration not valid.

The UE may determine whether the CG is valid based on whether a TA is valid. The UE may determine the CG resource/configuration is valid while the TA is valid. If the TA is not valid, the UE may consider the CG resource/configuration is not valid. In one example, whether a TA is valid may be based on a TA timer. For example, the UE may consider the TA is valid while the TA timer is running. The UE may consider the TA is not valid while the TA timer is not running. The TA timer (or a corresponding parameter) may be configured in the RRC release message and/or the CG configuration. In one example, whether a TA is valid may be based on an RSRP change volume. For example, the UE may consider the TA is not valid if the RSRP change is higher than a threshold. The threshold (for the RSRP change) may be configured in the RRC release message and/or the CG configuration.

The UE may determine whether the CG is valid based on whether the CG resource configuration is valid. In one example, when the CG resource configuration is (re-)initialized, the CG resource configuration may be valid. In one example, when the CG resource configuration is released/suspended/cleared, the CG resource configuration may be invalid. In one example, the CG resource configuration may be configured in the RRC release message.

The UE may determine whether the CG is valid based on whether data is available for transmission for only those DRBs/SRBs/LCHs for which the SDT is enabled. In one example, a UE may be configured with one or more DRBs/SRBs/LCHs specifically for the SDT.

The UE may determine whether the CG is valid based on whether an RSRP is higher than the configured RSRP threshold for the SDT. The RSRP threshold may be configured in the RRC release message and/or the CG configuration.

The UE may determine whether the CG is valid based on whether data volume for transmission is lower than a configured threshold for the SDT. The configured threshold may be configured in the RRC release message and/or the CG configuration.

The UE may determine whether the CG is valid based on an (explicit) indication received from the NW. In one example, the indication may indicate that a CG (associated with a beam) is valid or not. The indication my indicate whether a beam associated with a CG is valid or not.

The UE may determine whether the CG is valid based on whether a timer (e.g., a T319 or a timer similar to the T319) is running. The timer may be configured in the RRC release message and/or the CG configuration. In one example, the UE may determine that the CG resource/configuration is valid while the timer is running. The UE may determine that the CG resource/configuration is not valid while the timer is not running or when the timer expires. The timer may be used to detect the failure of the SDT. The timer may be (re-)started upon transmission of UL data when the UE is in the RRC_INACTIVE state. The timer may be (re-)started upon transmission of small data. The timer may be (re-)started upon transmission of an RRC resume request. The timer may be stopped upon reception of RRCResume, RRCSetup, RRCRelease, RRCRelease with suspendConfig or RRCReject message, cell re-selection and upon abortion of connection establishment by upper layers. When the timer expires, the UE may enter the action upon going to the RRC_IDLE state (e.g., with a specific RRC resume cause).

In action 112, if the UE determines that the CG is not valid, e.g., one criterion for determining CG validity is not satisfied, the UE may perform an RA-based SDT. For example, the UE may initiate an RA procedure. The UE may perform the transmission of an RA preamble, e.g., via the preamble/RA resource/PRACH resource that is configured for the SDT. The UE may perform UL transmission (for small data) via the Msg3/MsgA.

In action 114, if the UE determines that the CG is valid, e.g., all criteria for determining CG validity are satisfied, the UE may perform a CG-based SDT. For example, the UE may perform UL transmission (for small data) via the CG resource.

In action 116, if the criteria (e.g., DRB/SRB, data volume, and/or RSRP) for initiating the SDT procedure is not satisfied, the UE may initiate an RRC connection resume procedure (e.g., the UE may initiate transmission of the RRCResumeRequest). The process may then end (as action 120).

In action 118, the SDT procedure may be terminated/stopped/completed by an indication from the NW (e.g., a RRC release message), by a timer (e.g., the T319), and/or a specific event. The process may then end (as action 120).

RA-Based SDT

Figure 2:
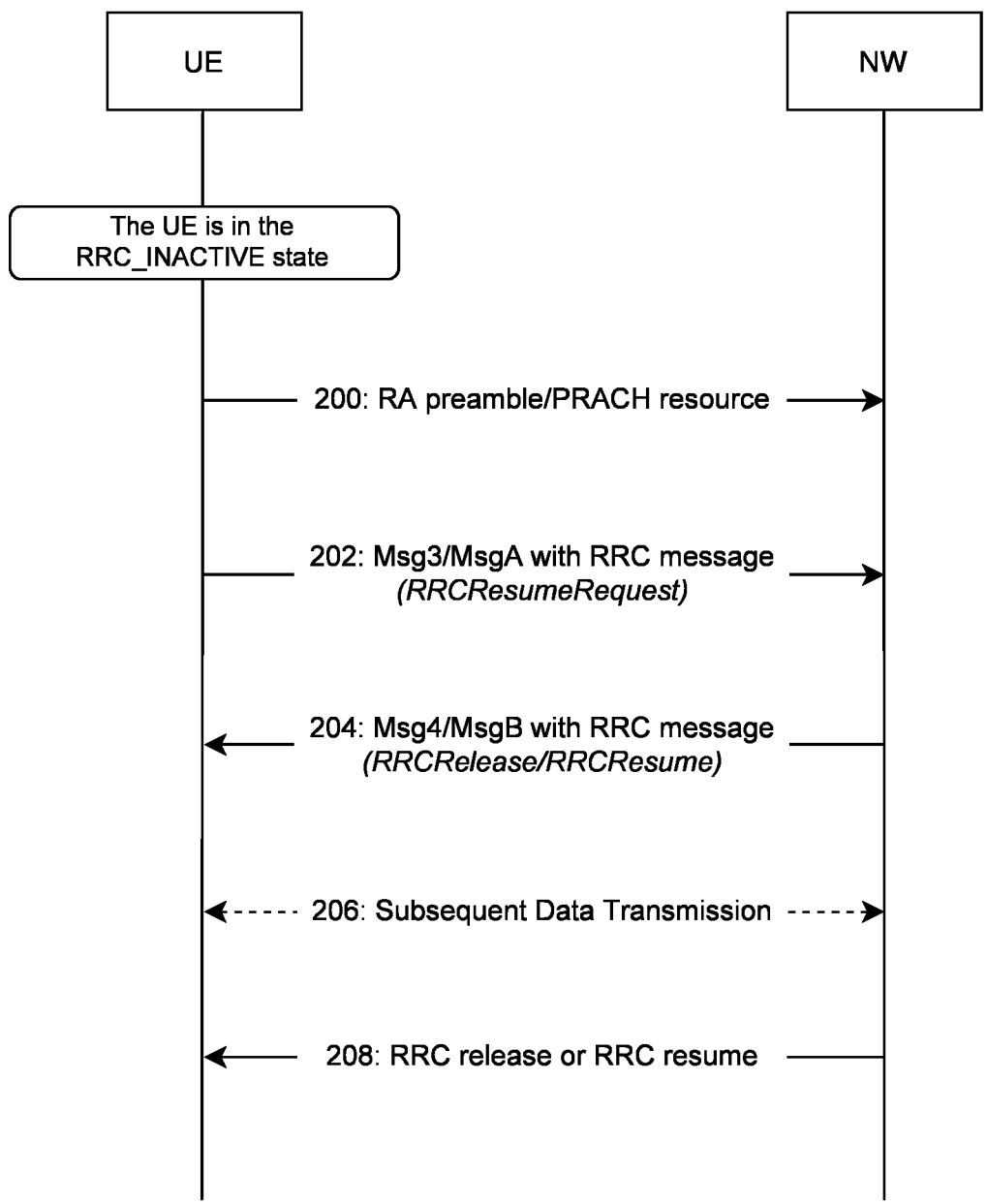
FIG. 2 illustrates a flowchart of an RA-based SDT procedure, according to an example implementation of the present disclosure.

FIG. 2 illustrates a flowchart of an RA-based SDT procedure 20, according to an example implementation of the present disclosure. In some implementations, actions of the RA-based SDT procedure 20 are illustrated as separate actions represented as independent blocks. In some other implementations, these separate actions may not be construed as necessarily order dependent, where any two or more actions may also be performed and/or combined with each other or be integrated with other alternate methods, which is not limiting the scope of the implementation. Moreover, in some other implementations, one or more of the actions may be adaptively omitted.

In action 200, when a UE in the RRC_INACTIVE state has UL data available for transmission and/or an SDT procedure has been initiated, the UE may initiate the RA-based SDT procedure 20 for the transmission of the UL data (e.g., in a case that the CG is considered as not valid). The UE may select either the 4-step RA type or the 2-step RA type. Moreover, since the preamble/PRACH resource for the RA-based SDT procedure 20 (e.g., RA preamble/PRACH resource with small data indication) and a normal RA procedure (e.g., RA preamble without small data indication) may be different, the UE may select the preamble/PRACH resource for the RA-based SDT procedure 20.

In action 202, after transmitting the RA preamble, the UE may transmit an RRC message, MAC CE(s), and/or UL data through Msg3 (when the 4-step RA type is selected) or MsgA (when the 2-step RA type is selected). The RRC message may be an RRCResumeRequest message. In addition to the RRC message, a MAC CE (e.g., BSR and/or PHR) and UL data (e.g., data associated with DRB(s) for the SDT) may be included in Msg3/MsgA as well.

In action 204, once Msg3/MsgA is transmitted, the UE may monitor (Temporary C-RNTI)/C-RNTI/RA-RNTI/MSGB-RNTI for Msg4/MsgB, in which the contention resolution ID may be carried. In addition, the NW may transmit an RRC message in Msg4/MsgB. The RRC message may be an RRCRelease message (with suspendConfig IE) or an RRCResume message. The UE may stay in the RRC_INACTIVE state if it receives an RRCRelease message (with suspendConfig IE) or enters the RRC_CONNECTED state if it receives an RRCResume message.

In action 206, once the RA procedure for the SDT is successfully completed, the UE may monitor a specific RNTI (e.g., C-RNTI) for subsequent data transmission. Subsequent data transmission may be the transmission of multiple UL and/or DL data packets as part of the SDT procedure and without transitioning to the RRC_CONNECTED state (e.g., the UE is still in the RRC_INACTIVE state). The UE may monitor a PDCCH via a specific RNTI (e.g., C-RNTI) to receive dynamic scheduling for a new UL/DL transmission and/or the corresponding retransmission. The UE may monitor a PDCCH via a UE-specific RNTI (e.g., C-RNTI) to receive dynamic scheduling for the retransmission of the UL transmission via the CG resource.

In action 208, the NW may send an RRC release (with suspendconfig) message to keep the UE in the RRC_INACTIVE state or have the UE transition to the RRC_IDLE state. Alternatively, the NW may send an RRC resume message to have the UE transition to the RRC_CONNECTED state. Once the RRCRelease message (with suspendConfig IE) is received, the UE may terminate the SDT procedure based on the RRCRelease message, and/or stop monitoring the C-RNTI, and/or stay in the RRC_INACTIVE state.

CG-Based SDT

Figure 3:
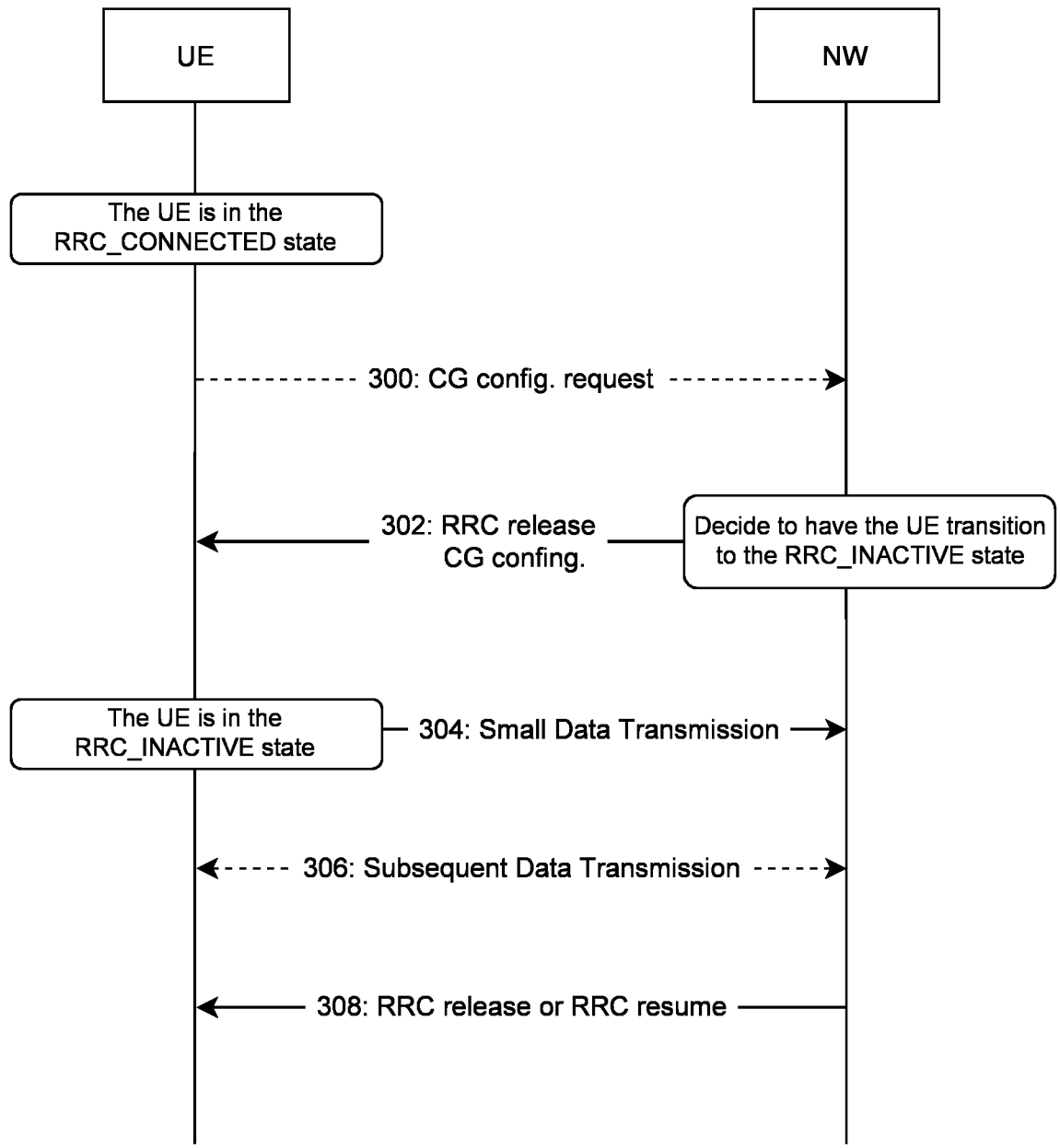
FIG. 3 illustrates a flowchart of a CG-based SDT procedure, according to an example implementation of the present disclosure.

FIG. 3 illustrates a flowchart of a CG-based SDT procedure 30, according to an example implementation of the present disclosure. In some implementations, actions of the CG-based SDT procedure 30 are illustrated as separate actions represented as independent blocks. In some other implementations, these separate actions may not be construed as necessarily order dependent, where any two or more actions may also be performed and/or combined with each other or be integrated with other alternate methods, which is not limiting the scope of the implementation. Moreover, in some other implementations, one or more of the actions may be adaptively omitted.

In action 300, when the UE is in the RRC_CONNECTED state and/or in the RRC_INACTIVE state, the UE may send a CG configuration request to the NW to indicate its preference on configuration with the CG for small data and/or for the RRC_INACTIVE state.

In action 302, the NW may decide to have the UE transition to the RRC_INACTIVE state by sending an RRCRelease message (including suspendconfig IE) to the UE. The RRC release message may include at least a CG configuration to configure the CG resources to the UE. The CG configuration may include at least one of the following information: CG periodicity, TBS, number for the implicit release of the CG resources, CG Timer, retransmission timer, number of HARQ process reserved for the CG in the SDT, an RSRP threshold for SSB selection and association between the SSB and CG resources, and TA related parameters (e.g., a TA timer).

In action 304, the UE may perform the SDT procedure based on the CG resources (in the RRC_INACTIVE state) according to the CG configuration (e.g., being configured in action 302). For example, the UE may transmit UL data (e.g., small data) via the CG resource (during the SDT procedure).

In action 306, subsequent data transmission may be the transmission of multiple UL/DL packets as part of the SDT procedure without transitioning to the RRC_CONNECTED state (e.g., the UE is still in the RRC_INACTIVE state). The UE may monitor a PDCCH via a specific RNTI (e.g., C-RNTI, CS-RNTI, and/or a specific RNTI) to receive dynamic scheduling for a new UL/DL transmission and/or the corresponding retransmission. The UE may monitor a PDCCH via a UE-specific RNTI (e.g., C-RNTI) to receive dynamic scheduling for the retransmission of the CG. The UE may perform subsequent data transmission via the CG resource according to the CG configuration (e.g., being configured in action 302).

In action 308, the NW may send an RRC release (with suspendconfig) message to keep the UE in the RRC_INACTIVE state or have the UE transition to the RRC_IDLE state. Alternatively, the NW may send an RRC resume message to have the UE transition to the RRC_CONNECTED state. Once the RRCRelease message (with suspendConfig IE) is received, the UE may terminate the SDT procedure based on the RRCRelease message, and/or stop monitoring the C-RNTI, and/or stay in the RRC_INACTIVE state.

Radio Protocol Architecture

Figure 4:
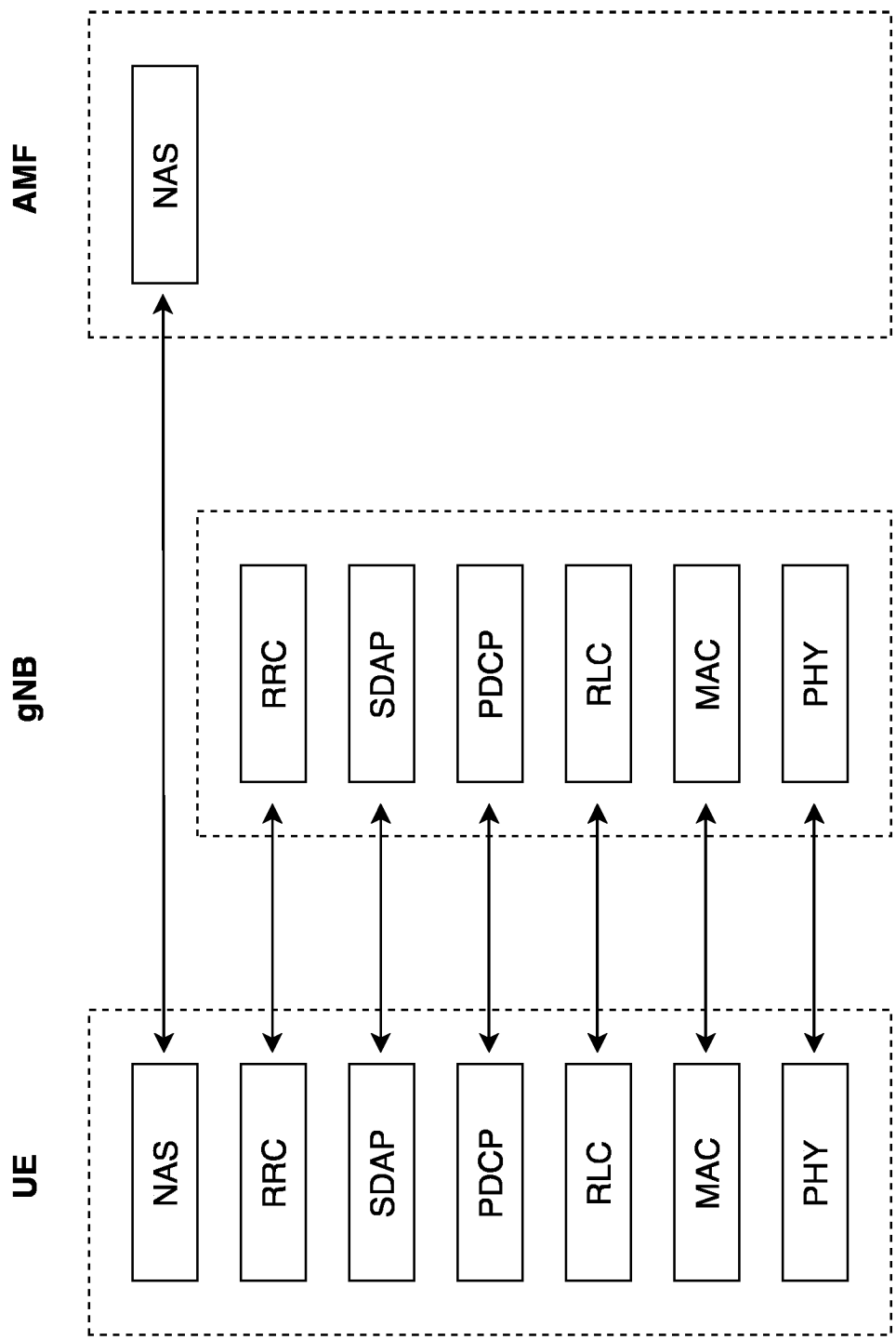
FIG. 4 illustrates a schematic diagram of a radio protocol stack including different sublayers, according to an example implementation of the present disclosure.

FIG. 4 illustrates a schematic diagram of a radio protocol stack 40 including different sublayers, e.g., NAS, RRC, SDAP, PDCP, RLC, MAC, and/or PHY layers, according to an example implementation of the present disclosure. Specifically, different layers of the radio protocol stack 40 may be responsible for different functions, where the different functions may be individually related to a control plane or a user plane.

In some implementations, for the control plane, control-relevant information may be exchanged between the NW and the UE. The establishment and management of sessions may occur at the highest layer of the control plane (e.g., the NAS layer). In addition, the next layer below the NAS layer is the RRC layer which exchanges control information with the device to set important parameters for the session.

In some implementations, for the user plane, the NW and the UE may exchange user data. The highest layers may be the application and IP layers that refer to the worldwide web and other applications running on it. As such, transmission of user data may go through the SDAP that is a new protocol layer for QoS management. The SDAP layer for the QoS management in the user plane provides mapping between QoS flow and DRBs and marking for QoS flow IDs in DL and UL packets for their way to the 5G core.

In some implementations, an IP header is replaced with a 5G equivalent one at the PDCP layer. The RLC layer may organize the data and retransmission. Prioritization and hybrid automated retransmission requests may take place at the MAC layer.

In some implementations, the last or lowest layer of the radio protocol stack 40 is the PHY layer, which may involve aspects for communication channels between the UE and the core NW as well as other aspects for modulation and beamforming.

In some implementations, data flows between the RLC, MAC, and PHY layers of the radio protocol stack 40 may be transmitted through the following channels:
- The logical channels are between the RLC and the MAC layers, where the logical channels may define the type of data that can be transferred;
- The transport channels carry information from the MAC layer to the PHY layer, where the transport channels may define how the information can be carried to the PHY layer and the characteristics of the data: and
- The PHY layer may directly communicate with the UE through the physical channels, where characteristics of the physical channels include at least one of timing, access protocols, and data rates.

SDT Failure Indication

As shown in FIG. 1, the UE may be configured with configurations for the SDT, e.g., SDT configuration (when the UE is in the RRC_INACTIVE state). In some implementations, the UE may initiate an SDT procedure (when the UE is in the RRC_INACTIVE state) based on some criteria, e.g., based on UL data for a DRB/SRB, a data volume threshold, and/or an RSRP threshold. There may be two types of SDT procedures. One type is based on an RA procedure (e.g., the 2-step RA and/or the 4-step RA), e.g., the RA-based SDT. The other type is based on a CG (e.g., the CG type 1, e.g., the CG-based SDT).

When/after the UE initiates an (RA-based and/or CG-based) SDT procedure, the UE may keep performing the SDT procedure until the SDT procedure is terminated (e.g., is determined, by the UE, as successfully completed and/or as failed). The SDT procedure that is initiated and has not been terminated may be an ongoing/running/pending SDT procedure. During the ongoing SDT procedure, the UE may be able to perform the SDT, perform the subsequent DL/UL data transmission, perform an RA procedure, and/or perform UL transmissions via the CG. In addition, the SDT procedure may be terminated by an indication from the NW (e.g., via an RRC release message), by a timer (e.g., T319), by a counter (e.g., preamble transmission counter), and/or a specific event.

In some implementations, the radio channel condition may be poor, e.g., when there is a blockage. As such, the connection quality between the UE and the NW may be weak, resulting in a poor transmission/reception situation between the NW and the UE. Accordingly, the UL transmission from the UE may fail, and the NW may not be able to receive the data from the UE. Also, the DL reception may be unsuccessful, and the UE may not be able to receive signal(s) from the NW.

Therefore, a failure handling mechanism for the SDT may be needed. In some implementations, the UE may detect whether an (RA-based and/or CG-based) SDT procedure has failed based on some criteria. If the (RA-based and/or CG-based) SDT procedure is considered as a failure, the UE may perform some actions/steps/solutions/procedures to handle this, as introduced in the following.

In some implementations, an SDT procedure may be initiated by an upper layer (e.g., an RRC layer). While the SDT procedure is ongoing, the functions of the SDT procedure may be performed by a lower layer (e.g., an RLC layer, a MAC layer, and/or a PHY layer). Since the SDT procedure may be executed with different cooperating layers of the UE, e.g., different layers may handle different functions of the SDT procedure, an inter-layer communication is needed.

Figure 5:
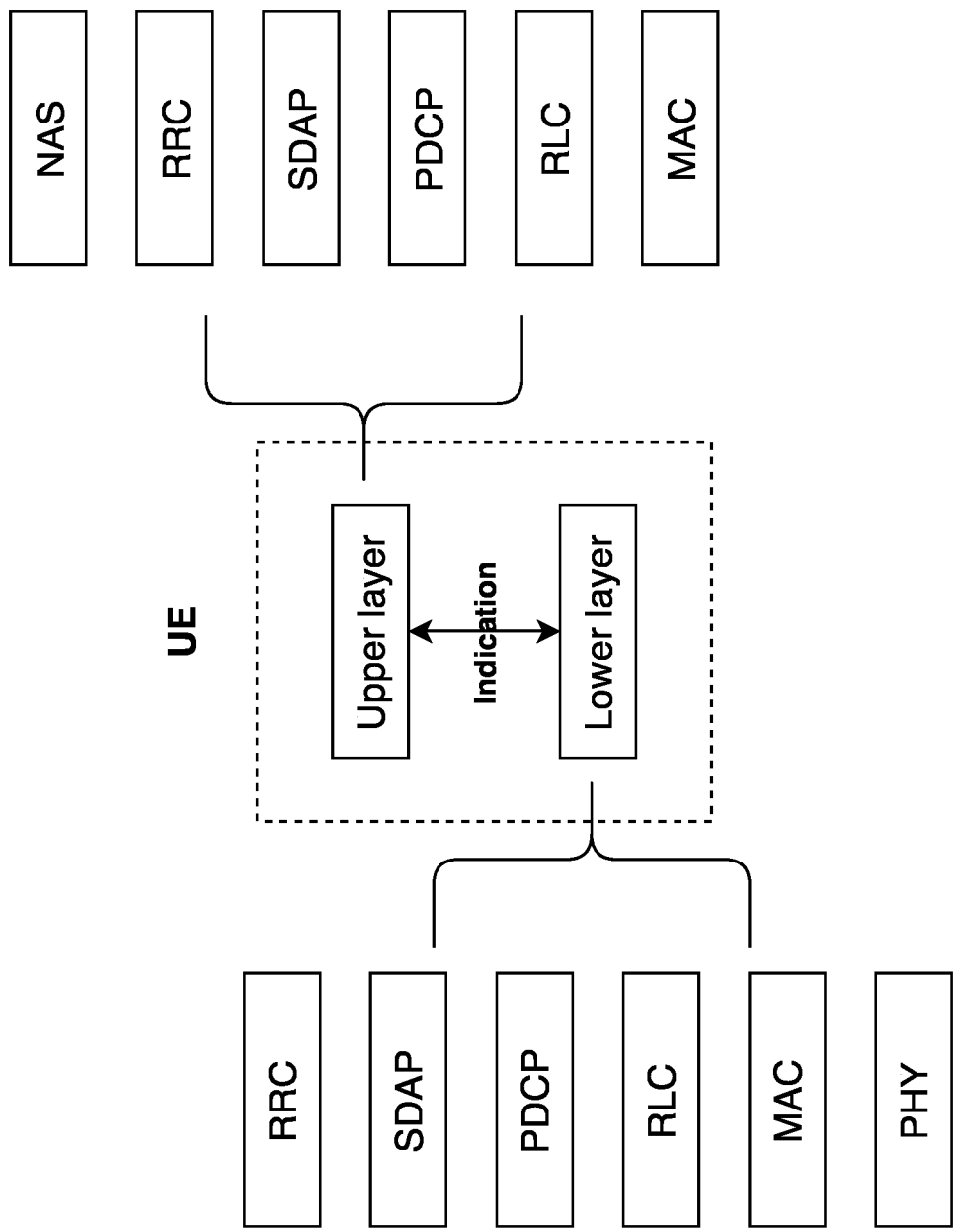
FIG. 5 illustrate a schematic diagram of an inter-layer indication, according to an example implementation of the present disclosure.

FIG. 5 illustrate a schematic diagram of an inter-layer indication 50, according to an example implementation of the present disclosure. As shown in FIG. 5, an upper layer of the UE may be referred to as at least one of the layers/entities mentioned above, e.g., NAS, RRC, SDAP, PDCP, RLC, and MAC. A lower layer of the UE may be referred to as at least one of the layers/entities mentioned above, e.g., RRC, SDAP, PDCP, RLC, MAC, and PHY.

In some implementations, for the SDT, when an SDT failure (or may be referred to as an SDT problem) and/or the conditions to initiate the SDT are not fulfilled, it may be detected by a lower layer or an upper layer. More examples are introduced in below.

In one example, if the SDT failure (and/or the conditions to initiate SDT are not fulfilled) is detected by the lower layer, the lower layer may need to indicate a specific indication (e.g., to indicate that the conditions to initiate SDT are not fulfilled) to an upper layer to inform this situation. When the upper layer receives the specific indication from the lower layer, the upper layer may need to perform some actions/steps/solutions/procedures accordingly.

In one example, if the SDT failure (and/or the conditions to initiate SDT are not fulfilled) is detected by the upper layer, the upper layer may need to indicate a specific indication (e.g., to indicate that the conditions to initiate SDT are not fulfilled) to a lower layer to inform this situation. When the lower layer receives the specific indication (e.g., to indicate that the conditions to initiate SDT are not fulfilled) from the upper layer, the lower layer may need to perform some actions/steps/solutions/procedures accordingly.

More specifically, there may be two different kinds of SDT failure for the RA-based SDT and the CG-based SDT. For example, one kind of SDT failure may be used for the RA-based SDT (e.g., an RA-based SDT failure), and the other kind of SDT failure may be used for the CG-based SDT (e.g., a CG-based SDT failure).

In some implementations, the lower layer of the UE may detect the SDT failure/problem (and/or the conditions to initiate SDT are not fulfilled) based on one or more of the following conditions. If one or more of the following conditions are satisfied, the lower layer of the UE may detect/consider that there is an SDT failure/problem (and/or the conditions to initiate SDT are not fulfilled). If one or more of the following conditions are satisfied, the lower layer of the UE may indicate a specific indication (e.g., to indicate that the conditions to initiate SDT are not fulfilled) to the upper layer of the UE.

In some implementations, the upper layer of the UE may detect the SDT failure/problem (and/or the conditions to initiate SDT are not fulfilled) based on one or more of the following conditions. If one or more of the following conditions are satisfied, the upper layer of the UE may detect/consider there is an SDT failure/problem (and/or the conditions to initiate SDT are not fulfilled). If one or more of the following conditions are satisfied, the upper layer of the UE may indicate a specific indication (e.g., to indicate that the conditions to initiate SDT are not fulfilled) to the lower layer of the UE. More conditions are introduced below.

In one example, the specific indication may indicate that the conditions to initiate SDT are not fulfilled. In one example, the specific indication may indicate that the conditions to initiate SDT are fulfilled. In one example, the specific indication may be an (RA-based and/or CG-based) SDT failure indication. In one example, the specific indication may be an (RA-based and/or CG-based) SDT problem indication. In one example, the specific indication may indicate that the SDT is successfully completed. In one example, the specific indication may indicate that the SDT is unsuccessfully completed. In one example, the specific indication may indicate that the SDT is terminated. In one example, the specific indication may be an RA problem indication. In one example, the specific indication may be a CG problem indication. In one example, the specific indication may be an RLF indication. In one example, the specific indication may be used to indicate that a maximum retransmission number has been reached. In one example, the specific indication may be a beam failure indication. In one example, the specific indication may be an "out-of-sync" indication. In one example, the specific indication may be an "in-sync" indication.

More specifically, there may be two different indications for the RA-based SDT and the CG-based SDT. For example, a first specific indication may be used for the RA-based SDT, and a second specific indication may be used for the CG-based SDT. More specifically, the first specific indication and/or the second specific indication may be new indications that may be different from the RA problem indication, RLF indication, beam failure indication, "out-of-sync" indication, and "in-sync" indication.

Counter-Based

In some implementations, the lower layer of the UE may detect the SDT failure/problem (and/or the conditions to initiate SDT are not fulfilled) based on a counter. The lower layer of the UE may determine whether to indicate a specific indication to the upper layer of the UE based on the counter.

In some implementations, the upper layer of the UE may detect the SDT failure/problem (and/or the conditions to initiate SDT are not fulfilled) based on a counter. The upper layer of the UE may determine whether to indicate a specific indication to the lower layer of the UE based on the counter.

In some implementations, the lower layer of the UE may maintain a counter. When the value of the counter reaches a maximum value for the counter (e.g., the value of the counter being equivalent to the maximum value plus one), the lower layer of the UE may detect the SDT failure/problem. When the value of the counter reaches a maximum value for the counter (e.g., the value of the counter being equivalent to the maximum value plus one), the lower layer of the UE may indicate a specific indication to the upper layer of the UE.

In some implementations, the upper layer of the UE may maintain a counter. When the value of the counter reaches a maximum value for the counter (e.g., the value of the counter being equivalent to the maximum value plus one), the upper layer of the UE may detect the SDT failure/problem (and/or the conditions to initiate the SDT are not fulfilled). When the value of the counter reaches a maximum value for the counter (e.g., the value of the counter being equivalent to the maximum value plus one), the upper layer of the UE may indicate a specific indication to the lower layer of the UE.

In one example, (when the value of the counter reaches a maximum value for the counter,) the lower layer of the UE may not indicate a specific indication to the upper layer of the UE while a prohibit timer is running. In one example, (when the value of the counter reaches to a maximum value for the counter,) the upper layer of the UE may not indicate a specific indication to the lower layer of the UE while a prohibit timer is running.

In one example, the prohibit timer may be (re-)started when the value of the counter reaches a maximum value for the counter, when the upper layer of the UE detects the SDT failure/problem (and/or the conditions to initiate the SDT are not fulfilled), and/or when the upper layer of the UE indicates a specific indication to the lower layer of the UE. In one example, the prohibit timer may be (re-)started when the value of the counter reaches a maximum value for the counter, when the lower layer of the UE detects the SDT failure/problem (and/or the conditions to initiate the SDT are not fulfilled), and/or when the lower layer of the UE indicates a specific indication to the upper layer of the UE.

In one example, the counter may be a transmission counter for the SDT. Specifically, the counter may be used to count a number of UL transmissions. In one example, the counter may be a failure counter for the SDT. Specifically, the counter may be used to count a number of a failure instance. In one example, the counter may be one of a PREAMBLE_TRANSMISSION_COUNTER, a PREAMBLE_POWER_RAMPING_COUNTER, a BFI_COUNTER, RETX_COUNT, and an SDT indication/instance COUNTER In one example, the maximum value for the counter may be specifically configured for the SDT. The maximum value for the counter may be configured via an RRC release message. The maximum value for the counter may be configured via the RRC release message with suspend configuration. The maximum value for the counter may be configured via a configuration for the SDT. The maximum value for the counter may be configured via a RACH configuration for the SDT. The maximum value for the counter may be configured via a CG configuration for the SDT. The maximum value for the counter may be configured via SI (e.g., an SIB). The maximum value for the counter may be one of an SDTFailureInstanceMaxCounter, a preambleTransMax, a msgA-TransMax, a beamFailureInstanceMaxCount, a maxRetxThreshold, an N310, an N311, and/or a new Nx.

In some implementations, the value of the counter may be reset, set to 0 or set to 1 if at least one of following conditions/situations is satisfied.

In one example, the value of the counter may be reset, set to 0 or set to 1 when the UE receives an RRC release message (with suspend configuration), where the RRC release message may include a configuration(s) for the SDT.

In one example, the value of the counter may be reset, set to 0, or set to 1 when the (RA-based and/or CG-based) SDT procedure is initiated. The value of the counter may be reset, set to 0, or set to 1 when the (RA-based and/or CG-based) SDT procedure is terminated/stopped/completed/aborted.

In one example, the value of the counter may be reset, set to 0, or set to 1 when the RA procedure is initiated. The value of the counter may be reset, set to 0, or set to 1 when the RA procedure is terminated/stopped/completed/aborted.

In one example, the value of the counter may be reset, set to 0, or set to 1 when a CG configuration is (re-)initialized. The value of the counter may be reset, set to 0, or set to 1 when the CG configuration is released/suspended/cleared.

In one example, the value of the counter may be reset, set to 0, or set to 1 when the UE (unsuccessfully) transmits a UL message or retransmits a UL message. In one aspect, the UL message may be transmitted via the Msg1/Msg3/MsgA/CG resource or a UL resource scheduled by the Msg2/MsgB/Msg4 (during the SDT procedure). In one aspect, the UL message may include an RRC resume request message (e.g., a RRCResumeRequest or a RRCResumeRequest1). In one aspect, the UL message may include small data (e.g., UL data associated with a specific SRB/DRB/LCH that is configured/enabled for the SDT). In one aspect, the UL message may include a MAC CE (e.g., the BSR MAC CE). In one aspect, if the UL message is (re-)transmitted based on a CG resource/configuration, the timer/window that corresponds to the CG configuration may be (re-)started. In one aspect, if the UL message is transmitted on a UL resource scheduled by a dynamic grant, and the dynamic grant is used for retransmission of a HARQ process being used for transmitting UL data via the CG resource, the timer/window that corresponds to the CG configuration may be (re-)started. In one aspect, the UE may determine whether the transmission of the UL message is successful or unsuccessful based on whether a response (e.g., ACK/NACK) is received.

In one example, the value of the counter may be reset, set to 0, or set to 1 when the UE receives a response from the NW. In one aspect, the response may be a Msg2/Msg4/MsgB and/or a response for a UL transmission via the CG resource. In one aspect, the response may be used for the contention resolution, e.g., for a RA procedure. In one aspect, the response may include an (HARQ) ACK/NACK, e.g., for a UL transmission via the CG resource. In one aspect, the response may contain a UL grant/DL assignment for a new transmission/retransmission. The response may be a PDCCH addressed to an RNTI (e.g., a C-RNTI, a CS-RNTI, a dedicated RNTI, an RNTI for SDT, and/or an RNTI for the CG). In one aspect, the response may indicate a UL grant for a new transmission for the HARQ process used for the transmission of a UL transmission for small data (e.g., the UL message). In one aspect, the response may include a specific command, e.g., a TA command MAC CE. In one aspect, the response may be one of an RRCResume, a RRCSetup, an RRCRelease, an RRCRelease with SuspendConfig, an RRCReestablishment, and an RRCReject. In one aspect, the value of the counter may be reset, set to 0, or set to 1 when the UE receives a PDCCH, e.g., addressed to an RNTI (e.g., a C-RNTI, a CS-RNTI, a dedicated RNTI, an RNTI for SDT, and/or an RNTI for the CG). In one aspect, the value of the counter may be reset, set to 0, or set to 1 when receiving a DL transmission, e.g., on a PDSCH.

In one example, the value of the counter may be reset, set to 0, or set to 1 when a timer or a window expires. In one example, the timer/window may be (re)started when the counter is incremented by 1. In one example, the timer/window may be (re)started when the counter reaches to a maximum value (e.g., based on a configured threshold).

In one example, the value of the counter may be reset, set to 0, or set to 1 when the UE performs a cell (re)-selection or an RNA update procedure.

In one example, the value of the counter may be reset, set to 0, or set to 1 when the UE changes the serving cell to another cell or when the UE camps on a new (suitable/acceptable) cell. For example, the value of the counter may be reset, set to 0, or set to 1 when the RA procedure is initiated on a second cell which is different from a first cell where the (CG and/or RA) configuration for the SDT and/or the maximum value for the counter is provided.

In one example, the value of the counter may be reset, set to 0, or set to 1 when the UE transitions the RRC state from the RRC_INACTIVE state to the RRC_IDLE state or the RRC_CONNECTED state.

In one example, the value of the counter may be reset, set to 0, or set to 1 when the UE performs a MAC reset operation. In one example, the value of the counter may be reset, set to 0, or set to 1 upon abortion of connection establishment (e.g., by upper layers).

In one example, the value of the counter may be reset, set to 0, or set to 1 when the maximum value for the counter is reconfigured. The maximum value for the counter may be reconfigured by the (suspendconfig of the) RRC Release message and/or broadcast SI (e.g., an SIB). The maximum value for the counter may be reconfigured by the RRC reconfiguration message. The maximum value for the counter may be reconfigured by an RRCResume message, an RRCSetup message, an RRCRelease message, an RRCRelease message with suspendConfig and/or an RRCReject message.

In one example, the value of the counter may be reset, set to 0, or set to 1 when the (CG and/or RA) configuration for the SDT is reconfigured. The (CG and/or RA) configuration for the SDT may be reconfigured by the (suspendconfig of the) RRC Release message and/or broadcast SI (e.g., an SIB).

In one example, the value of the counter may be reset, set to 0, or set to 1 when a UE changes/selects different carriers, e.g., from one SUL to one NUL or from one NUL to one SUL. In one example, the value of the counter may be reset, set to 0, or set to 1 when a UE changes between different BWPs, e.g., from an initial (UL/DL) BWP to a dedicated (UL/DL) BWP.

In one example, the value of the counter may be reset, set to 0, or set to 1 when the channel quality becomes qualified (e.g., the RSRP and/or SINR being higher/lower than a threshold). The UE may determine that the channel quality is good based on a cell-level/beam-level measurement, e.g., the measured cell-level/beam-level RSRP being above a configure threshold.

In one example, the value of the counter may be reset, set to 0, or set to 1 when at least one of the conditions to detect the SDT failure/problem (and/or the conditions to initiate SDT are not fulfilled) is satisfied. In one example, the value of the counter may be reset, set to 0, or set to 1 when at least one of the conditions to stop the timer/window is satisfied.

In some implementations, the value of the counter may be incremented by 1 if at least one of following conditions/situations is satisfied.

In one example, the value of the counter may be incremented by 1 if the UE skips a UL transmission (and/or does not generate a MAC PDU/TB).

In one example, the value of the counter may be incremented by 1 when the beam (e.g., associated with a CG resource) is not qualified. In one example, the value of the counter may be incremented by 1 when there is no beam associated with the CG resource being qualified. For example, the UE may determine that none of the (configured) beam's RSRP is above a threshold.

In one example, the value of the counter may be incremented by 1 if a timer or a window expires.

In one example, the value of the counter may be incremented by 1 if the UE performs a UL transmission but fails to receive a DL response from the NW, e.g., within a time period of a window/timer. The DL response may be a PDCCH addressed to a specific RNTI (e.g., C-RNTI) or (HARQ) ACK/NACK. The window/timer may be (re-)started (an offset) after the UL transmission. The UE may monitor for the DL response within a time period of a window and may not monitor for the DL response outside a time period of a window. The DL response may be a UL grant/DL assignment for a new transmission/retransmission. The DL response may be a TA command MAC CE. The DL response may be a response to (re)start a timer or a window.

In one example, the value of the counter may be incremented by 1 if at least one of the conditions to (re)start the timer/window is satisfied.

In one example, the value of the counter may be incremented by 1 by an upper layer when a specific indication is received from a lower layer. In one example, the value of the counter may be incremented by 1 by a lower layer when a specific indication is received from an upper layer. In one aspect, the specific indication may indicate that the conditions to initiate the SDT are not fulfilled. In one example, the specific indication may indicate that the conditions to initiate the SDT are fulfilled. In one aspect, the specific indication may be an (RA-based and/or CG-based) SDT failure indication. In one aspect, the specific indication may be an (RA-based and/or CG-based) SDT problem indication. In one aspect, the specific indication may indicate that the SDT is successfully completed. In one aspect, the specific indication may indicate that the SDT is unsuccessfully completed. In one aspect, the specific indication may indicate that the SDT is terminated. In one aspect, the specific indication may be an RA problem indication. In one aspect, the specific indication may be a CG problem indication. In one aspect, the specific indication may be an RLF indication. In one aspect, the specific indication may be used to indicate that a maximum retransmission number has been reached. In one aspect, the specific indication may be a beam failure indication. In one aspect, the specific indication may be an "out-of-sync" indication.

In one example, the specific indication may be an "in-sync" indication. The value of the counter may be incremented while a prohibit timer is not running. The value of the counter may not be incremented while a prohibit timer is running. The prohibit timer may be used to prohibit frequent incrementation of the counter. The prohibit timer may be (re)started each time when the value of the counter is incremented. The prohibit timer may be configured per (CG and/or RA) configuration for the SDT.

Timer/Window-Based

In some implementations, the lower layer of the UE may detect the SDT failure/problem (and/or the conditions to initiate SDT are not fulfilled) based on a timer/window. The lower layer of the UE may determine whether to indicate a specific indication to the upper layer of the UE based on the timer/window.

In some implementations, the upper layer of the UE may detect the SDT failure/problem (and/or the conditions to initiate SDT are not fulfilled) based on a timer/window. The upper layer of the UE may determine whether to indicate a specific indication to the lower layer of the UE based on the timer/window.

In some implementations, the lower layer of the UE may maintain a timer/window. In some implementations, the lower layer of the UE may (re-)start the timer/window. Upon the timer/window expiring, the lower layer of the UE may detect the SDT failure/problem (and/or the conditions to initiate SDT are not fulfilled). Upon the timer/window expiring, the lower layer of the UE may indicate a specific indication to the upper layer of the UE.

In some implementations, the upper layer of the UE may maintain a timer/window. In some implementations, the upper layer of the UE may (re-)start the timer/window. Upon the timer/window expiring, the upper layer of the UE may detect the SDT failure/problem (and/or the conditions to initiate SDT are not fulfilled). Upon the timer/window expiring, the upper layer of the UE may indicate a specific indication to the lower layer of the UE.

In one example, (when the timer/window expires,) the lower layer of the UE may not indicate a specific indication to the upper layer of the UE while a prohibit timer is running. In one example, (when the timer/windows expires,) the upper layer of the UE may not indicate a specific indication to the lower layer of the UE while a prohibit timer is running.

In one example, the prohibit timer may be (re-)started when the timer/window expires, when the upper layer of the UE detects the SDT failure/problem (and/or the conditions to initiate SDT are not fulfilled), and/or when the upper layer of the UE indicates a specific indication to the lower layer of the UE. In one example, the prohibit timer may be (re-)started when the timer/window expires, when the lower layer of the UE detects the SDT failure/problem (and/or the conditions to initiate SDT are not fulfilled), and/or when the lower layer of the UE indicates a specific indication to the upper layer of the UE.

In one example, the timer/window may be an SDT failure/problem detection timer. In one example, the timer/window may be specifically configured for the SDT. The value of the timer/window may be configured via an RRC release message. The value of the timer/window may be configured via an RRC release message with suspend configuration. The value of the timer/window may be configured via a configuration for the SDT. The value of the timer/window may be configured via a RACH configuration for the SDT. The value of the timer/window may be configured via a CG configuration for the SDT. The value of the timer/window may be configured via an IE UE-TimersAndConstants. The value of the timer/window may be configured via SI (e.g., an SIB).

In one example, the timer/window may be a cg-SDT-RetransmissionTimer. In one example, the timer/window may be a TA timer, a cg-SDT-TimeAlignmentTimer, an ra-ResponseWindow, a msgB-ResponseWindow, an ra-ContentionResolutionTimer, a configuredGrantTimer, a cg-ReTransmissionTimer, a drx-onDurationTimer, a drx-InactivityTimer, a drx-RetransmissionTimerDL, a drx-RetransmissionTimerUL, a T300, a T301, a T302, a T304, a T310, a T311, a T312, a T316, a T319, a T320, a T321, a T322, a T325, a T330, a T331, a T342, a T345, and/or a newly defined Timer (e.g., a T3xx).

In one example, the timer/window may be used for monitoring a response (e.g., for ACK/NACK). The timer/window may be a response window. In one example, the timer/window may be used for receiving a PDCCH/scheduling (e.g., for a new transmission or retransmission) from the NW.

In one example, the timer/window may be (re-)started when the SDT procedure is initiated. In one example, the timer/window may be (re-)started when at least one condition/situation to increment the value of the counter (by 1) is satisfied. In one example, the timer/window may be (re-)started when the subsequent transmission period is started.

In one example, the timer/window may be (re-)started when the UE transmits or retransmits a UL message. In one aspect, the UL message may be transmitted via a Msg1/Msg3/MsgA/CG resource or via a UL resource scheduled by a Msg2/MsgB/Msg4 (during the SDT procedure). In one aspect, the UL message may include an RRC resume request message (e.g., an RRCResumeRequest or an RR(ResumeRequest1). In one aspect, the UL message may include small data (e.g., UL data associated with a specific SRB/DRB/LCH that is configured/enabled for SDT). In one aspect, the UL message may include a MAC CE (e.g., a BSR MAC CE). In one aspect, if the UL message is (re-)transmitted based on a CG resource/configuration, the timer/window that corresponds to the CG configuration may be (re-)started. In one aspect, if the UL message is transmitted on a UL resource scheduled by a dynamic grant and the dynamic grant is used for retransmission of a HARQ process being used for transmitting UL data via the CG resource, the timer/window that corresponds to the CG configuration may be (re-)started.

In one example, the timer/window may be (re-)started when the UE receives a response from the NW. In one aspect, the response may be a Msg2/Msg4/MsgB and/or a response for a UL transmission via the CG resource. In one aspect, the response may be used for the contention resolution, e.g., for an RA procedure. In one aspect, the response may include an (HARQ/RRC) ACK/NACK message, e.g., for a UL transmission via the CG resource. As such, the timer/window corresponding to the CG configuration of the CG resource may be (re-)started. In one aspect, the response may contain a UL grant/DL assignment for a new transmission/retransmission. The response may be a PDCCH addressed to an RNTI (e.g., a C-RNTI, a CS-RNTI, a dedicated RNTI, an RNTI for the SDT, and/or an RNTI for the CG). As a result, if the UL grant/DL assignment is for indicating a retransmission of a HARQ process being used for transmitting UL data via the CG resource, the timer/window that corresponds to the CG configuration may be (re-)started. In one aspect, the response may indicate a UL grant for a new transmission for the HARQ process used for transmitting a UL transmission for small data (e.g., the UL message). In one aspect, the response may include a specific command, e.g., a TA command MAC CE. In one aspect, the response may include at least one of an RRCResume, an RRCSetup, an RRCRelease, an RRCRelease with SuspendConfig, an RRCReestablishment, and an RRCReject.

In one example, the timer/window may be (re-)started when the UE receives a PDCCH, e.g., addressed to an RNTI (e.g., a C-RNTI, a CS-RNTI, a dedicated RNTI, an RNTI for the SDT, and/or an RNTI for the CG). The timer/window may be (re-)started when the UE receives a DL assignment (e.g., on a PDCCH) and/or a DL message/data (e.g., on a PDSCH).

In one example, the timer/window may be (re-)started when a first timer (e.g., a HARQ RTT timer) expires, when the first timer may indicate a minimum duration before a DL assignment and/or a UL HARQ retransmission grant is expected by the UE/MAC entity.

In one example, the timer/window may be delayed to be (re-)started after a configured offset. The configured offset may indicate a minimum duration before a DL assignment and/or a UL HARQ retransmission grant is expected by the UE/MAC entity.

In one example, the timer/window may be stopped when the SDT procedure is terminated (e.g., determined, by the UE, as successfully completed and/or as failed). In one example, the timer/window may be stopped when the RA procedure is stopped/aborted. In one example, the timer/window may be stopped when the CG configuration is released/suspended/cleared. In one example, the timer/window may be stopped when the CG configuration is considered as being invalid, e.g., when a TAT for the CG configuration expires.

In one example, the timer/window may be stopped when the UE receives an indication from the NW. In one aspect, the indication may include at least one of an RRCResume, an RRCSetup, an RRCRelease, an RRCRelease with SuspendConfig, an RRCReestablishment, and an RRCReject. The indication may be a PDCCH addressed to an RNTI (e.g., a C-RNTI, a CS-RNTI, a dedicated RNTI, an RNTI for the SDT, and/or an RNTI for the CG). The indication may indicate to the UE to terminate the SDT procedure and/or the subsequent transmission period, e.g., based on a field of the indication. The indication may indicate to the UE to initiate an RRC procedure (e.g., an RRC connection resume procedure, an RRC establishment procedure, and/or an RRC reestablishment procedure). The indication may indicate to the UE to switch/fallback the types for the SDT, where the types may be an RA-based SDT, a CG-based SDT, a 2-step RA, or a 4-step RA.

In one example, the timer/window may be stopped when the UE receives a response from the NW. In one aspect, the response may be a Msg2/Msg4/MsgB and/or a response for a UL transmission via the CG resource. In one aspect, the response may be used for contention resolution, e.g., for a RA procedure. In one aspect, the response may include an ACK/NACK, e.g., for a UL transmission via the CG resource. In one aspect, the response may contain a UL grant/DL assignment for a new transmission/retransmission. The response may be a PDCCH addressed to an RNTI (e.g., a C-RNTI, a CS-RNTI, a dedicated RNTI, an RNTI for the SDT, and/or an RNTI for the CG). In one aspect, the response may indicate a UL grant for a new transmission for the HARQ process used for transmitting a UL transmission for small data (e.g., the UL message). In one aspect, the response may include a specific command, e.g., a TA command MAC CE. In one aspect, the response may be at least one of an RRCResume, an RRCSetup, an RRCRelease, an RRCRelease with SuspendConfig, an RRCReestablishment, and an RRCReject.

In one example, the timer/window may be stopped upon a cell selection or a cell re-selection. In one example, the timer/window may be stopped upon abortion of connection establishment by upper layers. In one example, the timer/window may be stopped upon the RNA update.

In one example, the timer/window may be stopped when the UE changes the serving cell to another cell or when the UE camps on a new (suitable/acceptable) cell. For example, the timer/window may be stopped when/after the UE establishes/resumes an RRC connection from the RRC_INACTIVE state on a second cell which is different from a first cell where the CG configuration was provided.

In one example, the timer/window may be stopped when the UE initiates an RRC re-establishment procedure. For example, the timer/window may be stopped when the UE sends an RRCReestablishmentRequest to the NW.

In one example, the timer/window may be stopped when the UE is indicated, by the NW, to perform carrier switching (e.g., from an NUL to a SUL or vice versa). In one example, the timer/window may be stopped when the UE is indicated, by the NW, to perform the (UL/DL) BWP switching.

In one example, the timer/window may be stopped when the (CG and/or RA) configuration for the SDT is reconfigured. The (CG and/or RA) configuration for the SDT may be reconfigured by the (suspendconfig of the) RRC Release message and/or broadcast SI (e.g., an SIB). The (CG and/or RA) configuration for the SDT may be reconfigured by the RRC reconfiguration message. The (CG and/or RA) configuration for the SDT may be reconfigured by an RRCResume message, an RRCSetup message, an RRCRelease message, an RRCRelease message with suspendConfig and/or an RRCReject message.

In one example, the timer/window may be stopped when at least one condition/situation to reset the counter or set the counter to 0/1 is satisfied.

In one example, the timer/window may be stopped when the upper layer of the UE receives the specific indication from the lower layer of the UE. The timer/window may be stopped when the lower layer of the UE receives the specific indication from the upper layer of the UE.

Condition-Based

In some implementations, the lower layer of the UE may detect the SDT failure/problem (and/or the conditions to initiate the SDT are not fulfilled) based on one or more conditions. The lower layer of the UE may determine whether to indicate a specific indication to the upper layer of the UE based on the one or more conditions.

In some implementations, the upper layer of the UE may detect the SDT failure/problem (and/or the conditions to initiate SDT are not fulfilled) based on one or more conditions. The upper layer of the UE may determine whether to indicate a specific indication to the lower layer of the UE based on the one or more conditions.

In some implementations, if one or more of the following conditions is satisfied (e.g., while the UE is performing an SDT procedure), the lower layer of the UE may detect the SDT failure/problem (and/or the conditions to initiate the SDT are not fulfilled). If one or more of the following conditions is satisfied (e.g., while the UE is performing an SDT procedure), the lower layer of the UE may indicate a specific indication to the upper layer of the UE.

In some implementations, if one or more of the following conditions is satisfied (e.g., while the UE is performing an SDT procedure), the upper layer of the UE may detect the SDT failure/problem (and/or the conditions to initiate the SDT are not fulfilled). If one or more of the following conditions is satisfied (e.g., while the UE is performing an SDT procedure), the upper layer of the UE may indicate a specific indication to the lower layer of the UE.

In one of the conditions, the SDT failure/problem (and/or the conditions to initiate SDT are not fulfilled) may be detected, and/or a specific indication may be indicated if a beam failure is detected and/or all of the beams/SSB are considered as not qualified (e.g., the RSRP of the beam/SSBs is lower than a threshold). Specifically, it is possible that all the configured beams/SSB (for the SDT) are determined as not qualified (e.g., RSRPs of all the beams are lower than the threshold), which may be denoted as the beam failure (for the SDT).

In one implementation, if (one or multiple or all) of the configured beams/SSBs (for the SDT) are determined as not qualified (e.g., RSRP(s) of (one or multiple or all) of the beam/SSB(s) is/are lower than a threshold), and/or a beam failure (for the SDT) is detected, the UE may detect the SDT failure/problem (and/or the conditions to initiate SDT are not fulfilled), and/or the lower layer of the UE may indicate a specific indication to the upper layer of the UE.

In one implementation, if (one or multiple or all) of the configured beams/SSBs (for the SDT) are determined as not qualified (e.g., RSRP(s) of (one or multiple or all) of the beam(s)/SSB is/are lower than a threshold), and/or a beam failure (for the SDT) is detected, the UE may detect the SDT failure/problem, and/or the upper layer of the UE may indicate a specific indication to the lower layer of the UE.

In one implementation, if none of the configured beams/SSBs (for the SDT) are determined as qualified (e.g., the RSRP of the beam/SSBs is above a threshold), the UE may detect the SDT failure/problem, and/or the lower layer of the UE may indicate a specific indication (e.g., indicate that the conditions to initiate the SDT are not fulfilled) to the upper layer of the UE.

In one implementation, if at least one of the configured beams/SSBs (for the SDT) are determined as qualified (e.g., the RSRP of the beam/SSBs is above a threshold), the lower layer of the UE may indicate a specific indication (e.g., indicate that the conditions to initiate the SDT are fulfilled) to the upper layer of the UE.

In one implementation, the UE may be configured with multiple beams/SSB (e.g., a SSB/TRS/CSI-RS/assistance RS/TCI-state), e.g., via a set or a list, for the UE to determine/select the beam/SSB for the SDT (e.g., during the SDT procedure). The UE may select the beam/SSB based on beam measurement (e.g., L1-RSRP measurements). The selected beam/SSB may be associated with a specific CG resource/occasion. The UE may transmit the UL data (e.g., small data) via the specific CG resource/occasion (which is associated with the selected beam/SSB), e.g., while the UE is in the RRC_INACTIVE state. Preferably, the UE may be provided with a set/list of (periodic) beams (e.g., a SSB/TRS/CSI-RS/assistance RS/TCI-state). Specifically, the set/list of (periodic) beams/SSB may be used for the failure detection (e.g., for the UE in the RRC_INACTIVE state). Specifically, the beams/SSB may be configured in the CG configuration (for the SDT). Specifically, the beams/SSB may be indicated for the association between the CG resources/occasions. Alternatively, the UE may determine the set/list of beams/SSB to include periodic RS resource configuration indexes with the same value as the RS indexes in the RS sets indicated by the CG configuration and/or by the RRC release message, and/or by a TCI-State for respective CORESETs used by the UE for monitoring a PDCCH, e.g., if a UE is not provided with a set/list of (period) beams/SSB. In one implementation, a UE may assess the radio quality based on the configured set/list of beams/SSB. Specifically, the Layer 1 (L1) (e.g., the PHY layer of the UE) may assess the radio link quality (according to the set of configured beams/SSB, e.g., for the CG-based SDT). Specifically, the UE may be configured with a (RSRP) threshold for determining whether the radio link is qualified. In one implementation, the L1 (e.g., the PHY layer of the UE) may provide a corresponding set of RSRP measurements (for the configured beam/SSB) to higher layers (e.g., the MAC layer of the UE) and/or provide an indication to higher layers (e.g., the MAC layer of the UE), e.g., when the radio link quality is worse than the configured (RSRP) threshold. In one implementation, the L1 (e.g., the PHY layer of the UE) may provide the indication to higher layers (e.g., the MAC layer of the UE) when the radio link quality is worse than the configured threshold with a periodicity.

In one of the conditions, the SDT failure/problem (and/or the conditions to initiate SDT are not fulfilled) may be detected, and/or a specific indication may be indicated if a TA is considered as invalid (e.g., a TA timer expires, and/or an RSRP change (for a cell, a beam/SSB or all the configured beam/SSB) is higher than a threshold).

In one implementation, whether a TA is considered as valid may be based on a TA timer. For example, the UE may consider the TA is valid while the TA timer is running. The UE may consider the TA is not valid while the TA timer expires.

In one implementation, whether a TA is considered as valid may be based on an RSRP change (for a cell, a beam/SSB or all the configured beam/SSB). For example, the UE may consider the TA is not valid if the RSRP change is higher than a threshold.

In one implementation, if a TA is considered as invalid (e.g., a TA timer expires, and/or the RSRP change (for a cell, a beam/SSB or all the configured beam/SSB) is higher than a threshold), the UE may detect the SDT failure/problem (and/or the conditions to initiate SDT are not fulfilled). If a TA is considered as invalid (e.g., a TA timer expires, and/or the RSRP change (for a cell, a beam or all the configured beam) is higher than a threshold), the upper layer of the UE may indicate a specific indication to the lower layer of the UE.

In one implementation, if a TA is considered as invalid (e.g., a TA timer expires, and/or RSRP change (for a cell, a beam/SSB or all the configured beam/SSB) is higher than a threshold), the UE may detect the SDT failure/problem (and/or the conditions to initiate SDT are not fulfilled), and/or the lower layer of the UE may indicate a specific indication to the upper layer of the UE.

In one implementation, the TA timer and/or the threshold for the RSRP change may be configured via an RRC release message (with a suspend configuration and/or with a configuration for the SDT). The UE may store and/or apply for the newly received TA timer and/or the threshold for the RSRP after receiving the RRC release message. The UE may delete/discard the TA timer and/or the threshold for the RSRP that is stored and/or applied by the UE before receiving the RRC release message.

In one of the conditions, the SDT failure/problem (and/or the conditions to initiate SDT are not fulfilled) may be detected, and/or a specific indication may be indicated if a CG resource/configuration is determined as invalid.

In one implementation, if a CG resource/configuration is determined as invalid, the UE may detect the SDT failure/problem (and/or the conditions to initiate SDT are not fulfilled). If a CG resource/configuration is determined as invalid, the upper layer of the UE may indicate a specific indication to the lower layer of the UE.

In one implementation, if a CG resource/configuration is determined as invalid, the UE may detect the SDT failure/problem (and/or the conditions to initiate the SDT are not fulfilled). If a CG resource/configuration is determined as invalid, the lower layer of the UE may indicate a specific indication (e.g., indicate that the conditions to initiate the SDT are not fulfilled) to the upper layer of the UE.

In one implementation, if a CG resource/configuration is determined as valid, the lower layer of the UE may indicate a specific indication (e.g., indicate that the conditions to initiate the SDT are fulfilled) to the upper layer of the UE.

In one implementation, the UE may determine whether the CG is valid based on whether the associated beam/SSB is valid. Whether the associated beam/SSB is valid may be based on an RSRP threshold. In one example, if there is at least one beam/SSB with an RSRP above the RSRP threshold, the UE may consider the CG resource/configuration valid. If there is no beam/SSB with a RSRP above the RSRP threshold, the UE may consider the CG resource/configuration not valid.

In one implementation, the UE may determine whether the CG is valid based on whether a TA is valid. The UE may determine the CG resource/configuration is valid while the TA valid. If the TA is not valid (e.g., a TA timer expires, and/or an RSRP change (for a cell, a beam/SSB or all the configured beams/SSB)), the UE may consider the CG resource/configuration not valid.

In one implementation, the UE may determine whether the CG is valid based on whether the CG resource/configuration is valid. When the CG resource configuration is (re-)initialized, the CG resource configuration may be valid. When the CG resource configuration is released/suspended, the CG resource configuration may be invalid.

In one implementation, the UE may determine whether the CG is valid based on whether data is available for transmission for only those DRBs for which the SDT is enabled. A UE may be configured with one or more DRBs/LCHs for the SDT.

In one implementation, the UE may determine whether the CG is valid based on whether an RSRP is above the configured RSRP threshold for the SDT.

In one implementation, the UE may determine whether the CG is valid based on whether a data volume for transmission is lower than a configured threshold for the SDT.

In one implementation, the UE may determine whether the CG is valid based on an (explicit) indication received from the NW. The indication may indicate that a CG (associated with a beam/SSB) is valid or not. The indication my indicate whether a beam/SSB associated with a CG is valid or not.

In one implementation, the UE may determine whether the CG is valid based on whether a timer (e.g., a T319 or a timer similar to the T319) is running.

In one implementation, the UE may determine that the CG resource/configuration is valid while the timer is running. The UE may determine that the CG resource/ configuration is not valid while the timer is not running or when the timer expires. The timer may be used to detect the failure of the SDT. The timer may be (re-)started upon transmission of UL data when the UE is in the RRC_INACTIVE state. The timer may be (re-)started upon transmission of small data. The timer may be (re-)started upon transmission of the RRC resume request. The timer may be stopped upon reception of an RRCResume message, an RRCSetup message, an RRCRelease message, an RRCRelease message with suspendConfig or an RRCReject message, a cell re-selection and upon abortion of connection establishment by upper layers. When the timer expires, the UE may perform one of following actions upon going to the RRC_IDLE state (e.g., with a specific RRC resume cause).

UE's Actions Upon Receiving SDT Failure Indication

Figure 6:
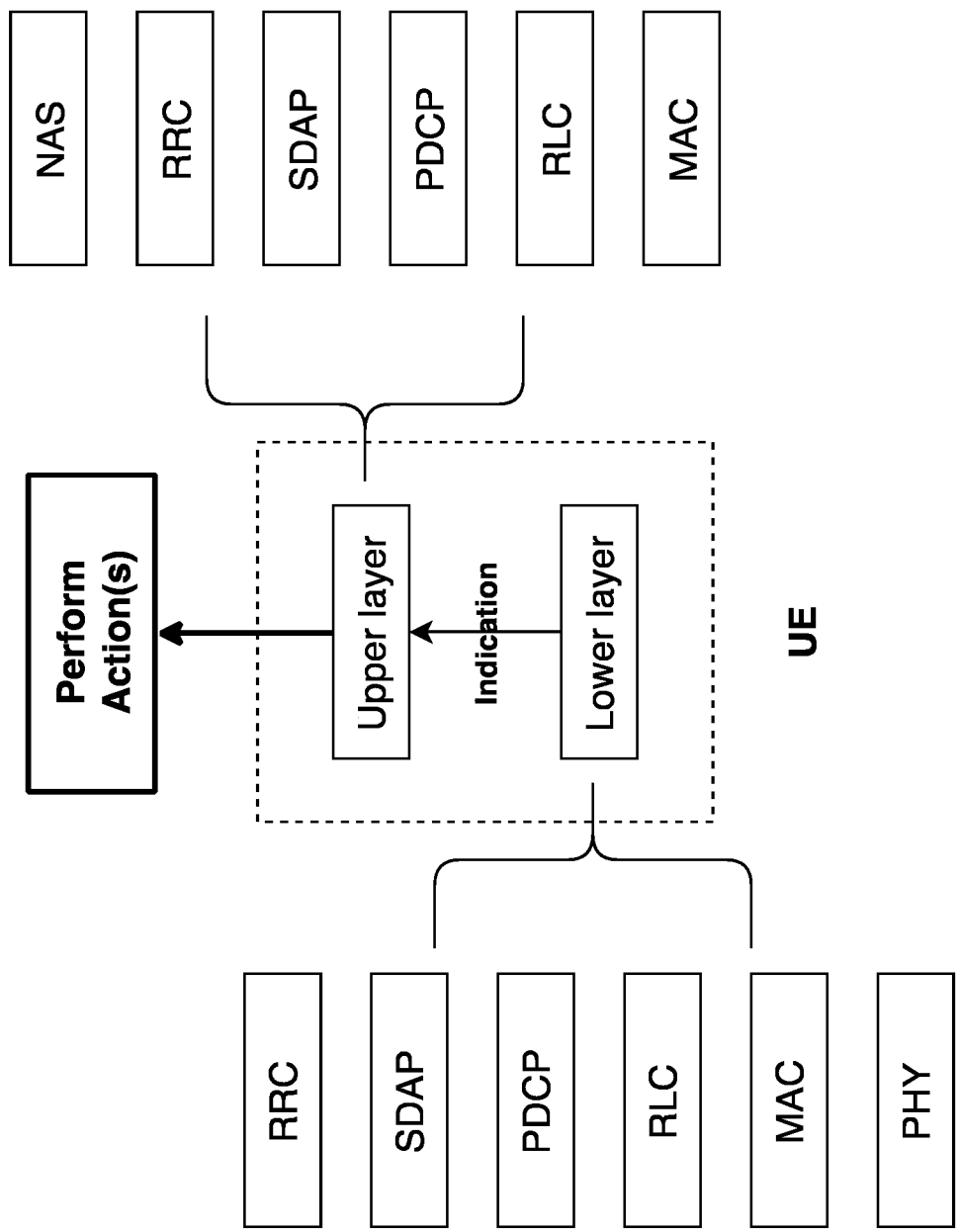
FIG. 6 illustrates a schematic diagram of actions performed by a UE upon receiving a specific indication from a lower layer, according to an example implementation of the present disclosure.
Figure 7:
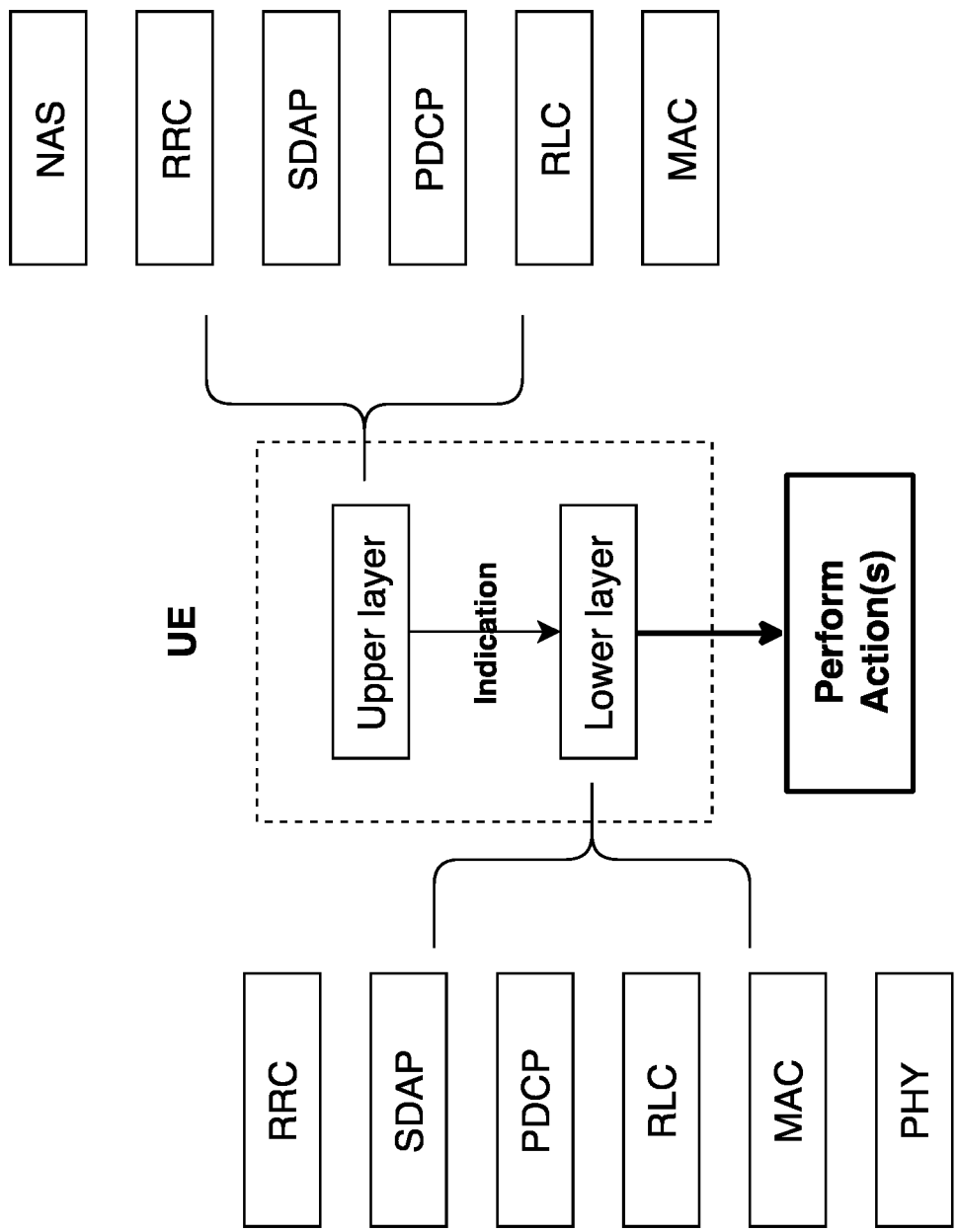
FIG. 7 illustrates a schematic diagram of actions performed by a UE upon receiving a specific indication from an upper layer, according to an example implementation of the present disclosure.

FIG. 6 illustrates a schematic diagram 60 of actions performed by a UE upon receiving a specific indication from a lower layer, according to an example implementation of the present disclosure. As shown in FIG. 6, if the upper layer of the UE receives a specific indication from the lower layer of the UE, the upper layer of the UE may perform one or more of following actions. FIG. 7 illustrates a schematic diagram 70 of actions performed by a UE upon receiving a specific indication from an upper layer, according to an example implementation of the present disclosure. As shown in FIG. 7, if the lower layer of the UE receives a specific indication from the upper layer of the UE, the lower layer of the UE may perform one or more of following actions.

In some implementations, the one or more actions may include terminating/stopping/completing/cancelling/aborting an (RA-based and/or CG-based) SDT procedure.

In one implementation, if the upper layer of the UE receives a specific indication from the lower layer of the UE, the upper layer of the UE may terminate/stop/complete/cancel/abort an (RA-based and/or CG-based) SDT procedure.

In one implementation, if the lower layer of the UE receives a specific indication from the upper layer of the UE, the lower layer of the UE may terminate/stop/complete/cancel/abort an (RA-based and/or CG-based) SDT procedure.

In some implementations, the one or more actions may include terminating/stopping/completing/cancelling/aborting an RA procedure.

In one implementation, if the upper layer of the UE receives a specific indication from the lower layer of the UE, the upper layer of the UE may terminate/stop/complete/cancel/abort an RA procedure.

In one implementation, if the lower layer of the UE receives a specific indication from the upper layer of the UE, the lower layer of the UE may terminate/stop/complete/cancel/abort an RA procedure.

In one implementation, the RA procedure may be an ongoing RA procedure.

In one implementation, the RA procedure may be initiated for the SDT. For example, the preamble and/or the PRACH resource and/or the UL resource for the Msg1/MsgA/Msg3 transmission is configured for the SDT.

In some implementations, the one or more actions may include releasing/discarding/suspending/storing/(re-)initializing a CG resource/configuration (for the SDT).

In one implementation, if the upper layer of the UE receives a specific indication from the lower layer of the UE, the upper layer of the UE may release/discard/suspend/(re-)initialize a (stored) CG resource/configuration (for the SDT).

In one implementation, if the lower layer of the UE receives a specific indication from the upper layer of the UE, the lower layer of the UE may release/discard/suspend/(re-)initialize a (stored) CG resource/configuration (for the SDT).

In one implementation, the CG resource/configuration may be configured via an RRC release message (with suspend configuration and/or a configuration for the SDT).

More specifically, the specific indication may be a CG-SDT resource release request.

More specifically, the (stored) CG resource/configuration may be included in an SDT configuration (e.g., in an sdt-MAC-PHY-config IE) and/or in a CG configuration.

In some implementations, the one or more actions may include considering a UL occasion (e.g., a CG occasion) as being skipped/failed.

In one implementation, if the upper layer of the UE receives a specific indication from the lower layer of the UE, the upper layer of the UE may consider a UL occasion (e.g., a CG occasion) as being skipped/failed.

In one implementation, if the lower layer of the UE receives a specific indication from the upper layer of the UE, the lower layer of the UE may consider a UL occasion (e.g., a CG occasion) as being skipped/failed.

In one implementation, the UL occasion may be an occasion for UL transmission. The UL transmission may be scheduled by a PDCCH from the NW. The UL transmission may be provided by a CG configuration.

In some implementations, the one or more actions may include suspending (transmission and reception of) one or more or all RB(s).

In one implementation, if the upper layer of the UE receives a specific indication from the lower layer of the UE, the upper layer of the UE may suspend (the transmission and reception of) one or more or all RB(s).

In one implementation, if the lower layer of the UE receives a specific indication from the upper layer of the UE, the lower layer of the UE may suspend (the transmission and reception of) one or more or all RB(s).

In one implementation, the RB(s) may be one or more or all SRB(s) (e.g., an SRB0, an SRB1, and/or an SRB2).

In one implementation, the RB(s) may be one or more or all DRB(s).

In one implementation, the RB(s) may be one or more or all DRB(s) configured for the SDT.

In one implementation, the RB(s) may be all SRB(s) and DRB(s), except an SRB0.

In some implementations, the one or more actions may include (re-)starting/stopping/resetting a timer/window.

In one implementation, if the upper layer of the UE receives a specific indication from the lower layer of the UE, the upper layer of the UE may (re-)start/stop/reset a timer/window.

In one implementation, if the lower layer of the UE receives a specific indication from the upper layer of the UE, the lower layer of the UE may (re-)start/stop/reset a timer/window.

In one implementation, the timer/window may be an SDT failure/problem detection timer.

In one implementation, the timer/window may be specifically configured for the SDT. The value of the timer/window may be configured via an RRC release message. The value of the timer/window may be configured via an RRC release message with suspend configuration. The value of the timer/window may be configured via a configuration for the SDT. The value of the timer/window may be configured via an RACH configuration for the SDT. The value of the timer/window may be configured via a CG configuration for the SDT. The value of the timer/window may be configured via an IE UE-TimersAndConstants. The value of the timer/window may be configured via SI (e.g., an SIB).

In one implementation, the timer/window may be a cg-SDT-RetransmissionTimer.

In one implementation, the timer/window may be a TA timer, a cg-SDT-TimeAlignmentTimer, an ra-ResponseWindow, an msgB-ResponseWindow, an ra-ContentionResolutionTimer, a configuredGrantTimer, a cg-RetransmissionTimer, a drx-onDurationTimer, a drx-InactivityTimer, a drx-RetransmissionTimerDL, a drx-RetransmissionTimerUL, a T300, a T301, a T302, a T304, a T310, a T311, a T312, a T316, a T319, a T320, a T321, a T322, a T325, a T330, a T331, a T342, a T345, an SDT failure detection timer, and/or a new Tx.

In one implementation, the timer/window may be used for monitoring a response (e.g., for an (HARQ) ACK/NACK). The timer/window may be a response window.

In one implementation, the timer/window may be used for receiving a PDCCH/scheduling (e.g., for a new transmission or retransmission) from the NW.

In some implementations, the one or more actions may include resetting a counter.

In one implementation, if the upper layer of the UE receives a specific indication from the lower layer of the UE, the upper layer of the UE may reset a counter.

In one implementation, if the lower layer of the UE receives a specific indication from the upper layer of the UE, the lower layer of the UE may reset a counter.

In one implementation, the counter may be a transmission counter for the SDT. Specifically, the counter may be used to count UL transmissions.

In one implementation, the counter may be a failure counter for the SDT. Specifically, the counter may be used to count failure instances.

In one implementation, the counter may be a PREAMBLE_TRANSMISSION_COUNTER, a PREAMBLE_POWER_RAMPING_COUNTER, a BFI_COUNTER, a RETX_COUNT, or an SDT indication/instance COUNTER.

In one implementation, a maximum value for the counter may be configured for the SDT. The maximum value for the counter may be configured via an RRC release message. The maximum value for the counter may be configured via an RRC release message with suspend configuration. The maximum value for the counter may be configured via a configuration for the SDT. The maximum value for the counter may be configured via an RACH configuration for the SDT. The maximum value for the counter may be configured via a CG configuration for the SDT. The maximum value for the counter may be configured via SI (e.g., an SIB).

In one implementation, the maximum value for the counter may be an SDTFailureInstanceMaxCounter, a preambleTransMax, a msgA-TransMax, a beamFailureInstanceMaxCount, a maxRetxThreshold, an N310, an N311, and/or a new Nx.

In some implementations, the one or more actions may include considering an RLF to be detected.

In one implementation, if the upper layer of the UE receives a specific indication from the lower layer of the UE, the upper layer of the UE may consider the RLF to be detected.

In one implementation, if the lower layer of the UE receives a specific indication from the upper layer of the UE, the lower layer of the UE may consider the RLF to be detected.

In one implementation, the lower layer/upper layer of the UE may consider the RLF to be detected for the source MCG, e.g., a source RLF.

In one implementation, the lower layer/upper layer of the UE may consider the RLF to be detected for the MCG, e.g., an MCG RLF.

In one implementation, the lower layer/upper layer of the UE may consider the RLF to be detected for the SCG, e.g., an SCG RLF.

In one implementation, if the lower layer/upper layer of the UE considers the RLF to be detected due to an SDT failure/problem, an RA problem, a CG problem, reaching of a maximum number of retransmissions, and/or if the RA procedure is initiated for the SDT, the lower layer/upper layer of the UE may set an IE rlf-Cause in a VarRLF-Report as an SDT failure/problem, an RA problem, a CG problem, an rlc-MaxNumRetx, and/or a new cause for the SDT. Specifically, an rlf-Cause field is used to indicate the cause of the last RLF that was detected.

In some implementations, the one or more actions may include initiating/triggering a procedure.

In one implementation, if the upper layer of the UE receives a specific indication from the lower layer of the UE, the upper layer of the UE may initiate/trigger a procedure.

In one implementation, if the lower layer of the UE receives a specific indication from the upper layer of the UE, the lower layer of the UE may initiate/trigger a procedure.

In one implementation, the procedure may be an RA procedure.

In one implementation, the procedure may be a BFR procedure.

In one implementation, the procedure may be an SDT procedure.

In one implementation, the procedure may be an RRC (connection) establishment procedure.

In one implementation, the procedure may be an RRC (connection) re-establishment procedure.

In one implementation, the procedure may be an RRC (connection) reconfiguration procedure.

In one implementation, the procedure may be an RRC (connection) release procedure.

In one implementation, the procedure may be an RRC (connection) resume procedure.

In some implementations, the one or more actions may include initiating a failure reporting procedure.

In one implementation, if the upper layer of the UE receives a specific indication from the lower layer of the UE, the upper layer of the UE may initiate a failure reporting procedure.

In one implementation, if the lower layer of the UE receives a specific indication from the upper layer of the UE, the lower layer of the UE may initiate a failure reporting procedure.

In one implementation, the failure reporting procedure may be used to an SDT failure/problem.

In one implementation, the failure reporting procedure may be used to report an RLC failure.

In one implementation, the failure reporting procedure may be used to report an MCG RLF.

In one implementation, the failure reporting procedure may be used to report an SCG RLF.

In one implementation, the failure reporting procedure may be used to request for modification of (CG and/or RA) configuration that is used for the SDT.

In some implementations, the one or more actions may include discarding any or all segments of segmented RRC messages, PDU(s), PDU segments, SDU(s), and/or SDU segments.

In one implementation, if the upper layer of the UE receives a specific indication from the lower layer of the UE, the upper layer of the UE may discard any or all segments of segmented RRC messages, PDU(s), PDU segments, SDU(s), and/or SDU segments.

In one implementation, if the lower layer of the UE receives a specific indication from the upper layer of the UE, the lower layer of the UE may discard any or all segments of segmented RRC messages, PDU(s), PDU segments, SDU(s), and/or SDU segments.

In some implementations, the one or more actions may include performing the actions upon transitioning to the RRC_IDLE state.

In one implementation, if the upper layer of the UE receives a specific indication from the lower layer of the UE, the upper layer of the UE may perform the actions upon transitioning to the RRC_IDLE state (with a release cause).

In one implementation, if the lower layer of the UE receives a specific indication from the upper layer of the UE, the lower layer of the UE may perform the actions upon transitioning to the RRC_IDLE state (with a release cause).

In one implementation, the UE may perform the actions upon transitioning to the RRC_IDLE state with a release cause (e.g., "SDT failure", "RRC connection failure", and/or "other").

In some implementations, the one or more actions may include indicating a PDCP suspend to lower layers.

In one implementation, if the upper layer of the UE receives a specific indication from the lower layer of the UE, the upper layer of the UE may indicate a PDCP suspend to lower layers.

In one implementation, if the lower layer of the UE receives a specific indication from the upper layer of the UE, the lower layer of the UE may indicate a PDCP suspend to lower layers.

In one implementation, the upper layer of the UE may indicate a PDCP suspend to lower layers of all DRBs.

In some implementations, the one or more actions may include resetting all state variables to the initial value.

In one implementation, if the upper layer of the UE receives a specific indication from the lower layer of the UE, the upper layer of the UE may reset all state variables to the initial value.

In one implementation, if the lower layer of the UE receives a specific indication from the upper layer of the UE, the lower layer of the UE may reset all state variables to the initial value.

In one implementation, the state variables may be UE variables (e.g., maintained in the RRC/SDAP/PDCP/RLC/MAC/PHY entities).

In some implementations, the one or more actions may include releasing the default radio configurations/default SRB configurations/default MAC Cell Group configuration.

In one implementation, if the upper layer of the UE receives a specific indication from the lower layer of the UE, the upper layer of the UE may release the default radio configurations/default SRB configurations/default MAC Cell Group configuration.

In one implementation, if the lower layer of the UE receives a specific indication from the upper layer of the UE, the lower layer of the UE may release the default radio configurations/default SRB configurations/default MAC Cell Group configuration.

In some implementations, the one or more actions may include resetting/(re-)establishing/releasing/suspending/reconfiguring a layer/entity.

In one implementation, if the upper layer of the UE receives a specific indication from the lower layer of the UE, the upper layer of the UE may reset/(re-)establish/release/suspend/reconfigure a layer/entity.

In one implementation, if the lower layer of the UE receives a specific indication from the upper layer of the UE, the lower layer of the UE may reset/(re-)establish/release/suspend/reconfigure a layer/entity.

In one implementation, the layer/entity may be the RRC, the SDAP, the PDCP, the RLC, the MAC, and/or the PHY.

In one implementation, the RLC entities may be RLC entities for an SRB1.

In one implementation, the UE may reset the MAC for the source MCG.

In one implementation, if a reconfiguration of the MAC entity is performed/requested, the MAC entity of the UE may perform at least one of the followings:

initializing the corresponding HARQ entity upon addition of an SCell;

removing the corresponding HARQ entity upon removal of an SCell;

applying the new value for timers when the timer is (re)started;

applying a new maximum parameter value when counters are initialized; and applying immediately the configurations received from upper layers for other parameters.

In one implementation, if a reset of the MAC entity is performed/requested, the MAC entity of the UE may perform at least one of the following:

initializing an variable (e.g., a Bj) for each logical channel to zero;

stopping (if running) all timers;

considering all TATs as expired and performing corresponding actions as specified in clause 5.2 of TS 38.321;

setting the NDIs for all UL HARQ processes to the value 0;

setting the NDIs for all HARQ process IDs to the value 0 for monitoring a PDCCH in SL resource allocation mode 1;

stopping, if any, an ongoing RA procedure;

discarding explicitly signaled CFRA Resources for the 4-step RA type and the 2-step RA type, if any;

flushing a Msg3 buffer;

flushing a MsgA buffer;

canceling, if any, a triggered SR procedure;

canceling, if any, a triggered BSR procedure;

canceling, if any, a triggered PHR procedure;

canceling, if any, a triggered BFR;

flushing the soft buffers for all DL HARQ processes;
for each DL HARQ process, considering the next received transmission for a TB as the first transmission;
releasing, if any, a Temporary C-RNTI; and
resetting all BFI_COUNTERs.

In some implementations, the lower layer/upper layer of the UE may perform at least one of the mentioned actions (only) while a specific timer/window is running. In some implementations, the lower layer/upper layer of the UE may perform at least one of the mentioned actions (only) while a specific timer/window is not running. In some implementations, the lower layer/upper layer of the UE may perform at least one of the mentioned actions (only) while a specific timer/window expires.

In one example, the timer/window may be an SDT failure/problem detection timer.

In one example, the timer/window may be configured for the SDT. The value of the timer/window may be configured via an RRC release message. The value of the timer/window may be configured via an RRC release message with suspend configuration. The value of the timer/window may be configured via a configuration for the SDT. The value of the timer/window may be configured via an RACH configuration for the SDT. The value of the timer/window may be configured via a CG configuration for the SDT. The value of the timer/window may be configured via an IE UE-TimersAndConstants. The value of the timer/window may be configured via SI (e.g., an SIB).

In one example, the timer/window may be a TA timer, a ra-ResponseWindow, a msgB-ResponseWindow, an ra-ContentionResolutionTimer, a configuredGrantTimer, a cg-RetransmissionTimer, a drx-onDurationTimer, a drx-InactivityTimer, a drx-RetransmissionTimerDL, a drx-RetransmissionTimerUL, a T300, a T301, a T302, a T304, a T310, a T311, a T312, a T316, a T319, a T320, a T321, a T322, a T325, a T330, a T331, a T342, a T345, and/or a new Tx.

Dependency

In some implementations, the subsequent transmission may be a DL and/or a UL data transmission.

In some implementations, a DRB may be associated with an LCH. The DRB(s), the LCH(s), and/or the LCG(s) may be configured for the SDT. For example, the UE may receive a configuration, e.g., via an RRC release message, to indicate whether the DRB(s), the LCH(s), and/or the LCH(s) can be used for the SDT. Specifically, the DRB(s)/LCH(s) configured for the SDT may not be suspended when the UE is in the RRC_INACTIVE state. Specifically, the DRB(s)/LCH(s) configured for the SDT may be resumed when an SDT procedure is initiated.

UE's Action Upon Transitioning to the RRC_IDLE State

If the lower layer/upper layer of the UE performs the actions upon being transitioned to the RRC_IDLE state, the UE may perform the following actions/operations:

1> resetting the MAC;
1> setting the variable pendingRNA-Update to false, if that is set to true;
1> if transitioning to the RRC_IDLE state was triggered by reception of the RRCRelease message including a waitTime:
  2> if a T302 is running:
    3> stopping the timer T302;
  2> starting the timer T302 with the value being set to the waitTime;
  2> informing upper layers that access barring is applicable for all access categories except for categories '0' and '2';
1> else:
  2> if the T302 is running:
    3> stopping the timer T302;
    3> performing the actions as specified in clause 5.3.14.4 of TS 38.331;
  2> if a T390 is running:
    2> stopping the timer T390 for all access categories;
    2> performing the actions as specified in 5.3.14.4 of TS 38.331;
1> if the UE is leaving the RRC_INACTIVE state:
  2> if transitioning to the RRC_IDLE state was not triggered by reception of the RRCRelease message;
    3> if being stored, discarding the cell reselection priority information provided by the cellReselectionPriorities;
    3> stopping a timer T320, if running;
1> stopping all timers that are running except for the timer as T302, T320, T325, T330, T331 and T400;
1> discarding the UE Inactive AS context, if any;
1> releasing the suspendConfig, if configured;
1> removing all the entries within VarConditionalReconfig, if any;
1> for each measId, if the associated reportConfig has a reportType set to condTriggerConfig:
  2> for the associated reportConfigId:
    3> removing the entry with the matching reportConfigId from the reportConfigList within the VarMeasConfig;
  2> if the associated measObjectId is only associated to a reportConfig with reportType being set to condTriggerConfig:
    3> removing the entry with the matching measObjectId from the measObjectList within the VarMeasConfig;
  2> removing the entry with the matching measId from the measIdList within the VarMeasConfig;
1> discarding the $K_{gNB}$ key, the S-$K_{gNB}$ key, the S-$K_{eNB}$ key, the $K_{RRCenc}$ key, the $K_{RRCint}$ key, the $K_{UPint}$ key and the $K_{UPenc}$ key, if any;
1> releasing all radio resources, including release of the RLC entity, the BAP entity, the MAC configuration and the associated PDCP entity and SDAP for all established RBs;
1> indicating the release of the RRC connection to upper layers together with the release cause;
1> discarding any segments of segmented RRC messages stored, as specified in clause 5.7.6.3 of TS 38.331;
1> except if transitioning to the RRC_IDLE state was triggered by inter-RAT cell reselection while the UE is in the RRC_INACTIVE state or the RRC_IDLE state or when selecting an inter-RAT cell while a T311 was running or when selecting an E-UTRA cell for EPS fallback for IMS voice, as specified in clause 5.4.3.5 of TS 38.331:
  2> entering the RRC_IDLE state and performing a cell selection, as specified in TS 38.304.

Figure 8:
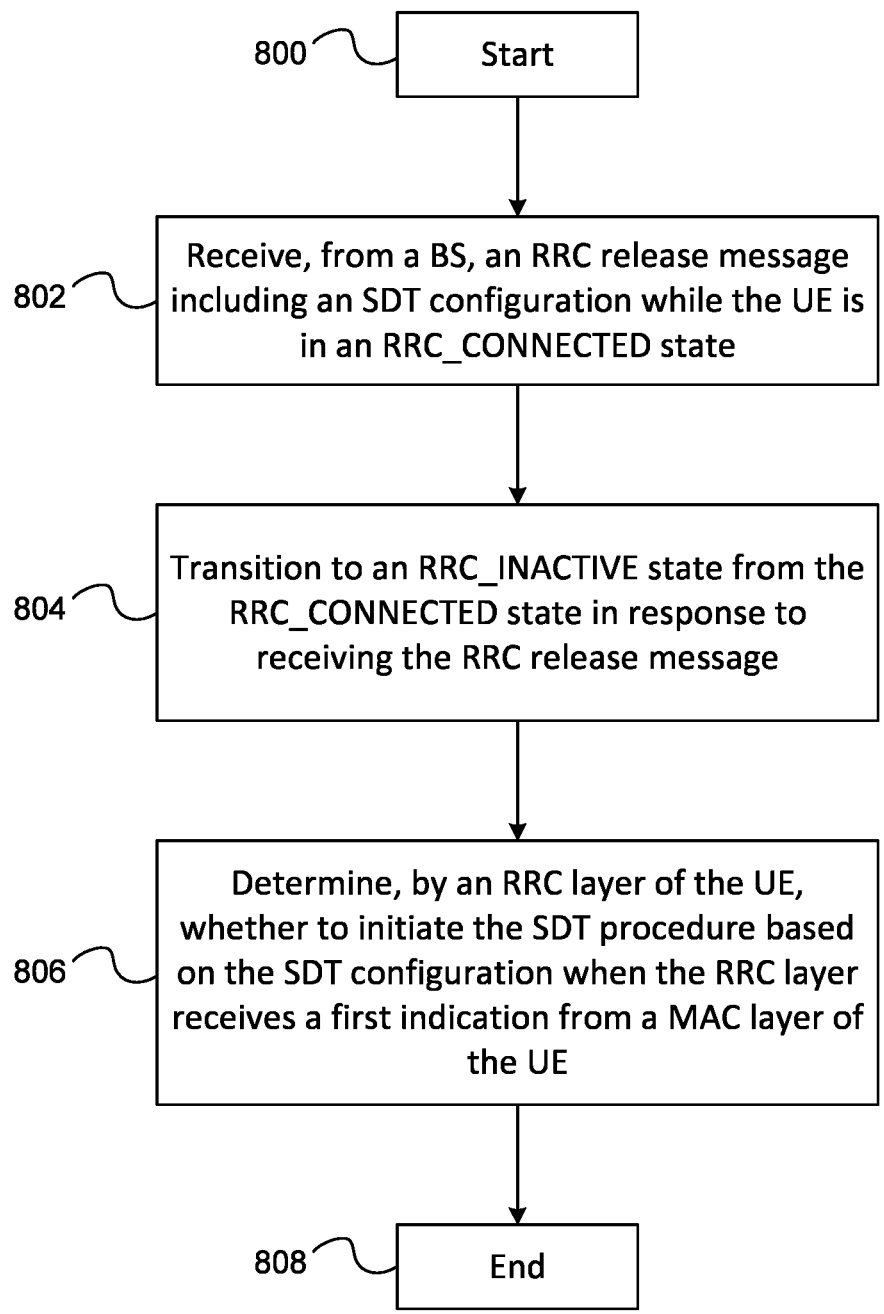
FIG. 8 is a flowchart illustrating an SDT procedure performed by a UE, according to an example implementation of the present disclosure.

FIG. 8 is a flowchart illustrating an SDT procedure or process 80 performed by a UE, according to an example implementation of the present disclosure. As shown in FIG. 8, the process 80 for the UE includes the following actions:

Action 800: Start.

Action 802: Receive, from a BS, an RRC release message including an SDT configuration while the UE is in an RRC_CONNECTED state.

Action 804: Transition to an RRC_INACTIVE state from the RRC_CONNECTED state in response to receiving the RRC release message.

Action 806: Determine, by an RRC layer of the UE, whether to initiate the SDT procedure based on the SDT configuration when the RRC layer receives a first indication from a MAC layer of the UE.

Action 808: End.

In some implementations, in action 802, the UE may be configured to receive the RRC release message including the SDT configuration in the RRC_CONNECTED state from the BS. In action 804, the UE may be configured to transition to the RRC_INACTIVE state from the RRC_CONNECTED state in response to receiving the RRC release message. In action 806, the RRC layer of the UE may be configured to determine whether to initiate the SDT procedure based on the SDT configuration when the RRC layer receives the first indication from the MAC layer of the UE. Specifically, the first indication indicates whether at least one condition for initiating the SDT procedure is fulfilled (or not). In one implementation, the at least one condition may comprise an RSRP of at least an SSB being above a threshold, where the threshold is a RSRP threshold configured for SSB selection for a CG-based SDT. In one implementation, the at least one condition may comprise a CG resource being valid.

In some implementations, the process 80 may further configure the RRC layer of the UE to transition to the RRC_IDLE state when a timer expires. In one implementation, the timer may be initiated by the RRC layer of the UE when the SDT procedure is initiated. In one implementation, timer may be initiated by the RRC layer of the UE upon transmission of an RRC resume request message to the BS. In one implementation, the timer may be stopped by the RRC layer of the UE upon reception of an RRC message from the BS. Specifically, the RRC message may be at least one of an RRC reject message, an RRC release message, an RRC setup message, and an RRC resume message. In one implementation, the timer may be stopped by the RRC layer of the UE upon performing a cell selection procedure or a cell reselection procedure.

In some implementations, the process 80 may further configure the RRC layer of the UE to transition to the RRC_IDLE state, when the RRC layer receives a second indication from an RLC layer of the UE. Specifically, the second indication indicates that a maximum number of retransmissions has been reached.

Figure 9:
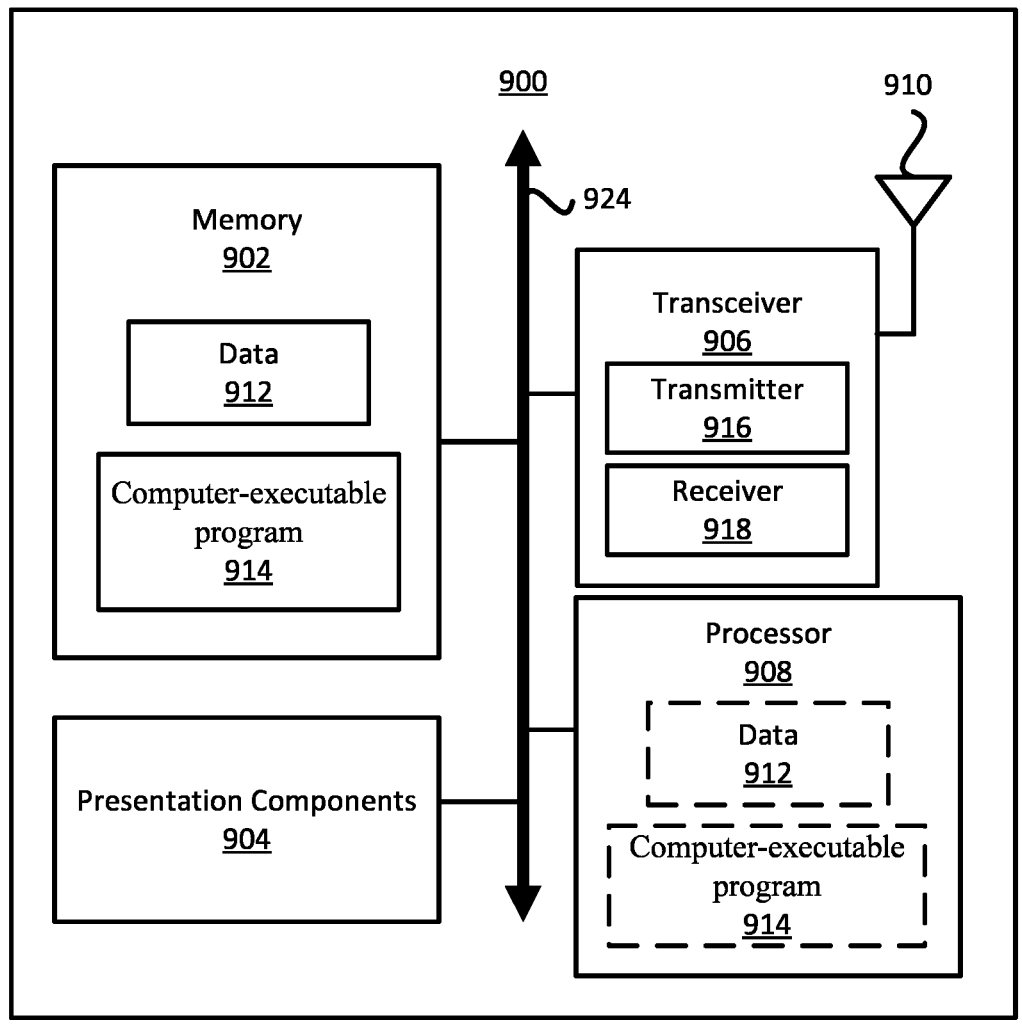
FIG. 9 is a block diagram illustrating a node for wireless communication according to an implementation of the present disclosure.

Please refer to FIG. 9, which illustrates a block diagram of a node 900 for wireless communication according to an implementation of the present disclosure. As illustrated in FIG. 9, the node 900 includes a transceiver 906, a processor 908, a memory 902, one or more presentation components 904, and at least one antenna 910. The node 900 may also include a Radio Frequency (RF) spectrum band module, a BS communications module, an NW communications module, and a system communications management module, input/output (I/O) ports, I/O components, and power supply (not explicitly illustrated in FIG. 9). Each of these components may be in communication with each other, directly or indirectly, over one or more buses 924. The node 900 may be a UE, a NW, a cell/BS or any operating entity in the wireless communication system 90 that performs various functions disclosed herein, for example, with reference to FIG. 8.

The transceiver 906 includes a transmitter 916 (e.g., transmitting/transmission circuitry) and a receiver 918 (e.g., receiving/reception circuitry) and may be configured to transmit and/or receive time and/or frequency resource partitioning information. The transceiver 906 may be configured to transmit in different types of subframes and slots, including, but not limited to, usable, non-usable and flexibly usable subframes and slot formats. The transceiver 906 may be configured to receive data and control channels.

The node 900 may include a variety of computer-readable media. Computer-readable media may be any available media that may be accessed by the node 900 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules, or other data in a modulated data signal such as a carrier wave or other transport mechanism and include any information delivery media.

The term "modulated data signal" may refer to a signal that has one or more of its characteristics set or changed in such a manner as to encode information in the signal. By way of example, and not limitation, communication media may include wired media such as a wired NW or direct-wired connection, and wireless media such as acoustic, RF, infrared and other wireless media. Combinations of any of the previous disclosure should also be included within the scope of computer-readable media.

The memory 902 may include computer-storage media in the form of volatile and/or non-volatile memory. The memory 902 may be removable, non-removable, or a combination thereof. For example, the memory 902 may include solid-state memory, hard drives, optical-disc drives, etc.

As illustrated in FIG. 9, the memory 902 may store a computer-executable (or readable) program 914 (e.g., software codes) that are configured to, when executed, cause the processor 908 to perform various functions disclosed herein, for example, with reference to FIG. 9. Alternatively, the computer-executable program 914 may not be directly executable by the processor 908 but may be configured to cause the node 900 (e.g., when compiled and executed) to perform various functions disclosed herein.

The processor 908 (e.g., having processing circuitry) may include an intelligent hardware device, a CPU, a microcontroller, an ASIC, etc. The processor 908 may include memory. The processor 908 may process the data 912 and the computer-executable program 914 received from the memory 902, and information received via the transceiver 906, the baseband communications module, and/or the NW communications module. The processor 908 may also process information to be sent to the transceiver 906 for transmission through the antenna 910 to the NW communications module for subsequent transmission to a CN.

One or more presentation components 904 may present data to a person or other device. Examples of presentation components 904 may include a display device, speaker, printing component, vibrating component, etc.

From the present disclosure, it is manifested that various techniques may be used for implementing the disclosed concepts without departing from the scope of those concepts. Moreover, while the concepts have been disclosed with specific reference to certain implementations, a person of ordinary skill in the art would recognize that changes may be made in form and detail without departing from the scope of those concepts. As such, the disclosed implementations are to be considered in all respects as illustrative and not restrictive. It should also be understood that the present disclosure is not limited to the particular disclosed implementations. Many rearrangements, modifications, and substitutions are possible without departing from the scope of the present disclosure.

What is claimed is:

1. A method performed by a User Equipment (UE) for a Small Data Transmission (SDT) procedure, the method comprising:
receiving, from a Base Station (BS), a Radio Resource Control (RRC) release message including an SDT configuration while the UE is in an RRC_CONNECTED state;
transitioning to an RRC_INACTIVE state from the RRC_CONNECTED state in response to receiving the RRC release message;
determining, by an RRC layer of the UE, whether to initiate the SDT procedure based on the SDT configuration when the RRC layer receives a first indication from a Medium Access Control (MAC) layer of the UE; and
transitioning, by the RRC layer, to an RRC IDLE state when the RRC layer receives a second indication from a Radio Link Control (RLC) layer of the UE,
wherein:
the first indication indicates whether at least one condition for initiating the SDT procedure is fulfilled or not,
the at least one condition comprises a Configured Grant (CG) resource being valid, and
the second indication indicates that a maximum number of retransmissions has been reached.

2. The method of claim 1, wherein the at least one condition further comprises a Reference Symbol Received Power (RSRP) of at least a Synchronization Signal Block (SSB) being above a threshold.

3. The method of claim 2, wherein the threshold is an RSRP threshold configured for SSB selection for a CG-based SDT.

4. The method of claim 1, further comprising:
transitioning, by the RRC layer, to the RRC_IDLE state when a timer expires.

5. The method of claim 4, further comprising:
initiating, by the RRC layer, the timer when the SDT procedure is initiated.

6. The method of claim 4, further comprising:
initiating, by the RRC layer, the timer upon transmission of an RRC resume request message to the BS.

7. The method of claim 4, further comprising:
stopping, by the RRC layer, the timer upon reception of an RRC message from the BS, wherein the RRC message is at least one of an RRC reject message, an RRC release message, an RRC setup message, and an RRC resume message.

8. The method of claim 4, further comprising:
stopping, by the RRC layer, the timer upon performing a cell selection procedure or a cell reselection procedure.

9. A User Equipment (UE) in a wireless communication system for a Small Data Transmission (SDT) procedure, the UE comprising:
at least one processor; and
at least one non-transitory computer-readable medium coupled to the at least one processor, storing one or more computer-executable instructions that, when executed by the at least one processor, cause the UE to:
receive, from a Base Station (BS), a Radio Resource Control (RRC) release message including an SDT configuration while the UE is in an RRC_CONNECTED state;
transition to an RRC_INACTIVE state from the RRC_CONNECTED state in response to receiving the RRC release message;
determine, by an RRC layer of the UE, whether to initiate the SDT procedure based on the SDT configuration when the RRC layer receives a first indication from a Medium Access Control (MAC) layer of the UE, UE; and
transition, by the RRC layer, to an RRC IDLE state when the RRC layer receives a second indication from a Radio Link Control (RLC) layer of the UE,
wherein:
the first indication indicates whether at least one condition for initiating the SDT procedure is fulfilled or not,
the at least one condition comprises a Configured Grant (CG) resource being valid, and
the second indication indicates that a maximum number of retransmissions has been reached.

10. The UE of claim 9, wherein the at least one condition further comprises a Reference Symbol Received Power (RSRP) of at least a Synchronization Signal Block (SSB) being above a threshold.

11. The UE of claim 10, wherein the threshold is an RSRP threshold configured for SSB selection for a based CG-based SDT.

12. The UE of claim 9, wherein the one or more computer-executable instructions, when executed by the at least one processor, further cause the UE to:
transition, by the RRC layer, to the RRC_IDLE state when a timer expires.

13. The UE of claim 12, wherein the one or more computer-executable instructions, when executed by the at least one processor, further cause the UE to:
initiate, by the RRC layer, the timer when the SDT procedure is initiated.

14. The UE of claim 12, wherein the one or more computer-executable instructions, when executed by the at least one processor, further cause the UE to:
initiate, by the RRC layer, the timer upon transmission of an RRC resume request message to the BS.

15. The UE of claim 12, wherein the one or more computer-executable instructions, when executed by the at least one processor, further cause the UE to:
stop, by the RRC layer, the timer upon reception of an RRC message from the BS, wherein the RRC message is at least one of an RRC reject message, an RRC release message, an RRC setup message, and an RRC resume message.

16. The UE of claim 12, wherein the one or more computer-executable instructions, when executed by the at least one processor, further cause the UE to:
stop, by the RRC layer, the timer upon performing a cell selection procedure or a cell reselection procedure.

* * * * *